US008249278B2

(12) United States Patent  
Ito et al.

(10) Patent No.: US 8,249,278 B2  
(45) Date of Patent: Aug. 21, 2012

(54) AUDIO SIGNAL PROCESSING SYSTEM

(75) Inventors: Toshiyuki Ito, Hamamatsu (JP); Makoto Hiroi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1357 days.

(21) Appl. No.: 11/825,019

(22) Filed: Jul. 3, 2007

(65) Prior Publication Data

US 2008/0056514 A1 Mar. 6, 2008

(30) Foreign Application Priority Data

Jul. 5, 2006 (JP) .................................. 2006-185148  
Jul. 5, 2006 (JP) .................................. 2006-185149

(51) Int. Cl.  
*H04B 1/00* (2006.01)

(52) U.S. Cl. .......................................... 381/119; 700/94

(58) Field of Classification Search .................. 381/119, 381/61, 123, 104, 102; 700/94; 84/609, 84/600; 715/205, 201, 715–728  
See application file for complete search history.

(56) References Cited

U.S. PATENT DOCUMENTS

| | | | | |
|---|---|---|---|---|
| 5,959,610 A | * | 9/1999 | Silfvast | 345/156 |
| 2002/0188364 A1 | * | 12/2002 | Ota et al. | 700/94 |
| 2004/0179699 A1 | * | 9/2004 | Moeller et al. | 381/73.1 |
| 2005/0195999 A1 | | 9/2005 | Takemura et al. | |

FOREIGN PATENT DOCUMENTS

| | | |
|---|---|---|
| JP | 63-282523 | 11/1988 |
| JP | 2004-118272 | 4/2004 |
| JP | 2004-246668 | 9/2004 |
| JP | 2004-325459 | 11/2004 |
| JP | 2005-032315 | 2/2005 |
| JP | 2005-252686 | 9/2005 |
| WO | WO-2005/006335 | 1/2005 |

OTHER PUBLICATIONS

Digital Mixing Engine DME64N/24N Instruction Manual, Yamaha Corporation, p. 11, 2004.  
DME Designer Version 1.1 Instruction Manual, Yamaha Corporation, 2004, pp. 203-207.  
DME Designer Owner's Manual, Version 1.2, Yamaha Corporation, pp. 3-5, 14-17, and 237-243, date 2004.  
Notification of Reasons for Refusal (Office Action), JP Patent Application No. 2006-185149, dated Aug. 25, 2008.

* cited by examiner

*Primary Examiner* — Xu Mei  
*Assistant Examiner* — Lun-See Lao  
(74) *Attorney, Agent, or Firm* — Morrison & Foerster LLP

(57) ABSTRACT

In an audio signal processing system, a plurality of audio signal processing apparatuses are previously linked to form a zone, and logically defined as devices belonging to a zone, and further the devices are grouped into a plurality of device groups within the zone. Each of the audio signal processing apparatuses includes a device group table that registers information specifying controls which are performed in respective audio signal processing apparatuses belonging to a device group in case that a group control command is given for collectively controlling the device group, and a master table that registers information specifying controls which are performed in respective device groups included in the zone in case that a zone control command is given for collectively controlling the zone. Both the collective control of the zone and the collective control of the device group are performed.

12 Claims, 17 Drawing Sheets

FIG.3A

| Scene No. | Config | Master | Slave 1 | Slave 2 |
|---|---|---|---|---|
| 001 | Config 01 | Preset 001 | Preset 001 | Preset 002 |
| 002 | Config 01 | Preset 002 | Preset 002 | Preset 002 |
| 003 | Config 02 | — | Preset 003 | — |
| 004 | Config 02 | Preset 003 | — | Preset 001 |
| 005 | Config 02 | Preset 003 | — | — |

FIG.3B

| Scene Link No. | Device Group 1 | Device Group 2 | Device Group 3 |
|---|---|---|---|
| 001 | Scene 001 | Scene 001 | Scene 001 |
| 002 | — | Scene 002 | Scene 001 |
| 003 | Scene 003 | — | Scene 002 |
| 004 | Scene 004 | Scene 003 | — |

FIG.3C

| Scene No. | Config | Master | Slave 1 | Slave 2 |
|---|---|---|---|---|
| 001 | Config 01 | Preset 001 | Preset 001 | Preset 002 |
| 002 | Config 01 | Preset 002 | Preset 002 | Preset 002 |
| 003 | Config 01 | Preset 002 | Preset 003 | Preset 004 |
| 004 | Config 02 | Preset 003 | Preset 005 | Preset 001 |
| 005 | Config 02 | Preset 003 | Preset 003 | Preset 003 |

FIG.3D

| Scene No. | Config | Master | Slave 1 | Slave 2 |
|---|---|---|---|---|
| 001 | Config 01 | Preset 001 | Preset 001 | Preset 001 |
| 002 | Config 01 | Preset 001 | Preset 002 | Preset 002 |
| 003 | Config 02 | Preset 002 | Preset 002 | Preset 004 |
| 004 | Config 02 | Preset 001 | Preset 003 | Preset 003 |

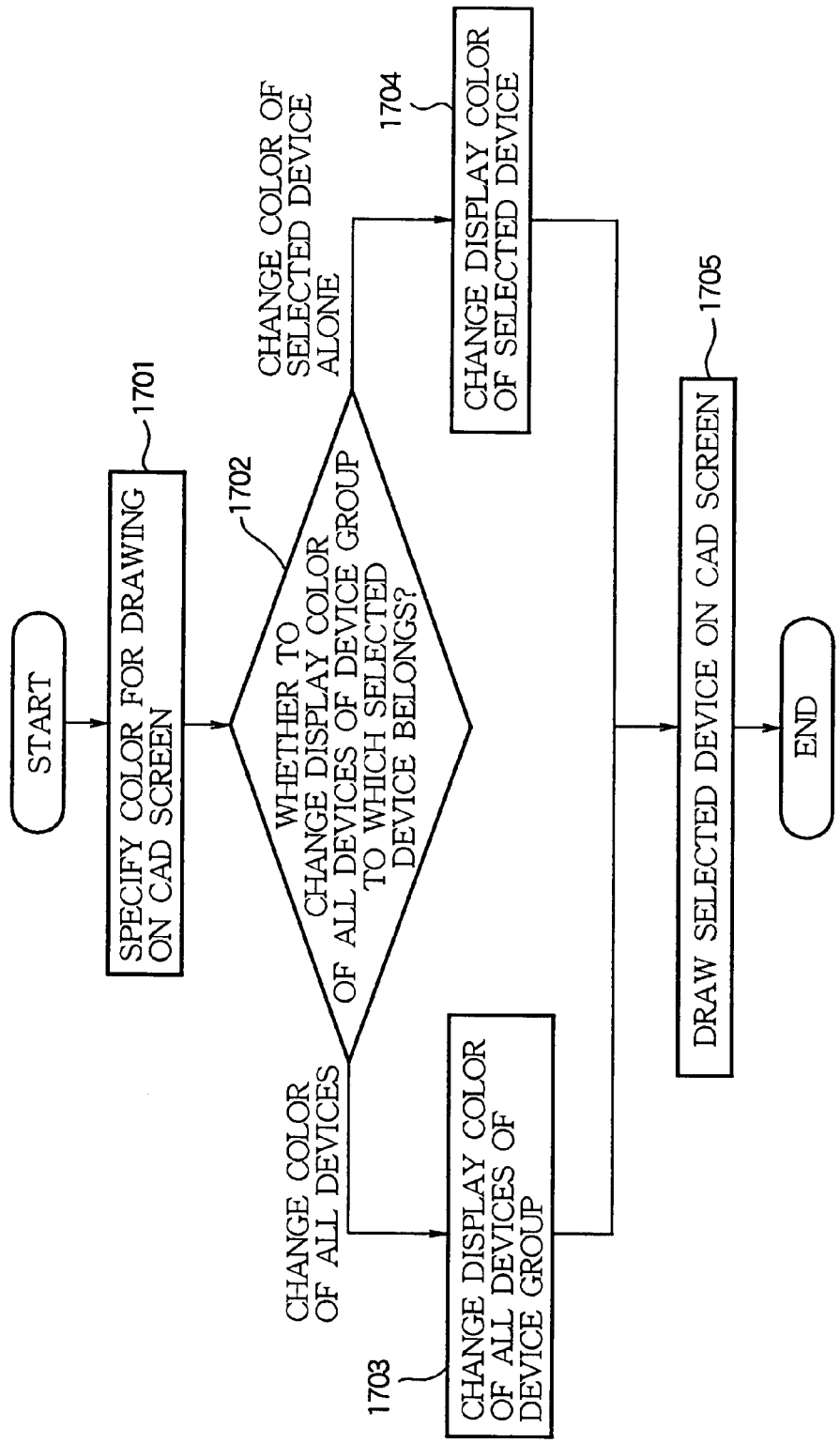

AUDIO SIGNAL PROCESSING SYSTEM

BACKGROUND OF THE INVENTION

1. Technical Field of the Invention

The present invention relates to an audio signal processing system that links a plurality of audio signal processing apparatuses to operate the apparatuses in a cooperative manner.

2. Description of the Related Art

A known audio signal processing apparatus includes an audio signal processing unit which is constructed of a processor (for example, a Digital Signal Processor (DSP)) that can be operated according to a program and that can process audio signals based on a mixer configuration (signal processing configuration) edited using an external Personal Computer (PC). This audio signal processing apparatus is referred to as a "mixing engine" in this specification of patent application. The mixing engine can internally store a signal processing configuration edited and transmitted by a PC and can independently process audio signals based on the stored signal processing configuration. It is also possible to construct a large-size mixer system by combining a plurality of mixing engines. Non-Patent Reference 1, "Digital Mixing Engine DME64N/24N Instruction Manual", Yamaha, 2001, P. 111, has introduced a concept called "zone" to allow a plurality of mixing engines to operate in a cooperative manner. In addition, Patent Reference 1, Japanese Patent Application Publication No. 2005-252686, has disclosed an audio signal processing system that freely links a plurality of mixing engines to construct a zone, thereby achieving cooperative operation on a zone basis.

When a mixer system is constructed by combining a plurality of mixing engines in this manner, the mixer system may have functions to display a zone configuration screen representing the overall system configuration to allow the user to view the connection relationship or the like of each mixing engine and to allow the user to connect lines between the variety of devices on the zone configuration screen and to create a screen representing the overall configuration. For example, see Non-Patent Reference 2, "DME Designer Version 1.1 Instruction Manual", Yamaha, 2004, P. 203-207.

In the related art, devices interlock or mutually link to each other on a zone basis and thus there is a problem in that devices in one zone cannot be controlled from devices in another zone. This is because devices in one zone have no means for communicating with devices of another zone. In addition, when a plurality of zones are provided, the related art has a problem in that it is not possible to collectively control devices of the plurality of zones at the same time although there is a demand for collective control of the plurality of zones from the PC.

There is also a problem with "scenes" which is a preset of mixing parameters. Namely, it is not possible to perform scene recall of a plurality of zones in an interlocking (or cooperative) manner. This is because a master device of a zone manages only slave devices under its control. Even when a scene recall instruction is issued at a PC, it is only possible to specify one zone and to instruct scene recall of the specified zone and it is not possible to instruct collective scene recall of a plurality of zones.

In addition, it is not possible to make a setting for a specific scene such that a specific device in the same zone is not interlocked for the specific scene. That is, when a scene is recalled in a zone, this scene recall must be performed for all devices in the zone since all devices in the zone always interlock with each other. However, one may desire to recall a scene in a part of devices while keeping the current state of the remaining part of the devices unchanged (i.e., without recalling the scene in the remaining devices).

In the related art, devices interlock with each other on a zone basis as described above and thus, when a system configuration screen is displayed on a monitor for editing, windows (frames) must be displayed respectively for zones. That is, configurations of a plurality of zones cannot be displayed as a whole in one window. However, according to the user selection manner, one audio system may be constructed of a plurality of zones and, in this case, one may desire to view the entirety of the plurality of zones on a single screen. The related art cannot satisfy this desire.

SUMMARY OF THE INVENTION

It is an object of the present invention to provide a grouping technology, whereby, in the case where a mixer system is constructed by combining a plurality of mixing engines, a plurality of groups is constructed of arbitrary mixing engines and it is possible to manipulate (or control) the plurality of groups in an interlocking manner and also to manipulate them in a non-interlocking manner and, particularly, it is possible to perform collective scene recall of a plurality of groups and also to perform scene recall of devices in one group without affecting other groups.

It is another object of the present invention to provide an apparatus for editing an audio system configuration, which ensures that all the configurations of a plurality of device groups are viewed as a whole on a single screen even when the plurality of groups are constructed of arbitrary mixing engines in the case where a mixer system is constructed by combining a plurality of mixing engines.

In order to achieve the above objects, the present invention provides an audio signal processing system comprising a plurality of audio signal processing apparatuses that process audio signals according to specified signal processing configurations, the plurality of the audio signal processing apparatuses being connected to each other through a network. The plurality of the audio signal processing apparatuses are previously linked to form a zone, and are defined as devices belonging to the zone, and further the devices are grouped into a plurality of device groups within the zone. Each of the plurality of the audio signal processing apparatuses includes a device group table that registers information specifying controls which are performed in respective audio signal processing apparatuses belonging to a device group in case that a group control command is given for collectively controlling the device group, and a master table that registers information specifying controls which are performed in respective device groups included in the zone in case that a zone control command is given for collectively controlling the zone. The audio signal processing apparatus belonging to the device group comprises a receiving section that receives a control command issued by a user manipulation or a control command inputted from an external device through the network, a determining section that determines whether the received control command is a group control command or a zone control command, a first transmitting section operative when the received control command is the group control command for transmitting an individual control command corresponding to the received group control command to each of the audio signal processing apparatuses belonging to the device group, with reference to the device group table, and a second transmitting section operative when the received control command is the zone control command for transmitting an individual group control command according to the received zone control command to each of the device groups included in the zone, with reference to the master table, whereby both the collective control of the zone and the collective control of the device group are performed. This allows both collective control on a zone basis and collective control on a device group basis.

Preferably, the device group table registers the information including information specifying control commands which are given to a part of the audio signal processing apparatuses belonging to the device group in case that the group control command has been given, and information indicating that no control command is given to the other part of the audio signal processing apparatuses belonging to the device group. The master table registers the information including information specifying group control commands which are given to a part of the device groups included in the zone in case that the zone control command has been given, and information indicating that no control command is given to the other part of the device groups included in the zone. This makes it possible to specify an audio signal processing apparatus that is not to be controlled.

The present invention also provides an audio signal processing system comprising a plurality of audio signal processing apparatuses that process audio signals according to specified signal processing configurations, the plurality of the audio signal processing apparatuses being connected to each other through a network. The plurality of the audio signal processing apparatuses are linked to form a zone and are defined as devices belonging to the zone, and further the devices are grouped into a plurality of device groups within the zone. Each of the plurality of the audio signal processing apparatuses includes a device group scene table that registers information specifying scene recalls which are performed in each of the audio signal processing apparatuses belonging to a device group in case that a group scene recall command is given for collectively commanding a scene recall of the device group, and a scene master table that registers information specifying scene recalls which are performed in each of the plurality of the device groups included in the zone in case that a zone scene recall command is given for collectively commanding a scene recall of the zone. The audio signal processing apparatus belonging to the device group comprises a receiving section that receives a scene recall command issued by a user manipulation or a scene recall command inputted from an external device through the network, a determining section that determines whether the received scene recall command is a device group scene recall command or a zone scene recall command, a first transmitting section operative when the received scene recall command is the device group scene recall command for transmitting an individual scene recall command corresponding to the received device group scene recall command to each of the audio signal processing apparatuses belonging to the device group, with reference to the device group scene table, and a second transmitting section operative when the received scene recall command is the zone scene recall command for transmitting an individual device group scene recall command according to the received zone scene recall command to each of the plurality of the device groups included in the zone with reference to the scene master table, whereby both collective scene recall of the zone and collective scene recall of the device group can be performed. This allows both collective scene recall on a zone basis and collective scene recall on a device group basis.

Preferably, the device group scene table registers the information including information specifying scene recall commands which are given to a part of the plurality of the audio signal processing apparatuses belonging to the device group in case that the device group scene recall command is given, and information indicating that no scene recall command is given to the other part of the plurality of the audio signal processing apparatuses belonging to the device group. The scene master table registers the information including information specifying scene recall commands which are given to a part of the plurality of the device groups included in the zone in case that the zone scene recall command is given, and information indicating that no scene recall command is given to the other part of the plurality of the device groups included in the zone. This makes it possible to specify an audio signal processing apparatus that is not to be recalled.

The present invention further provides a configuration editing apparatus for displaying and editing configurations of a plurality of audio signal processing apparatuses that process audio signals according to the configurations in an audio signal processing system including the plurality of the audio signal processing apparatuses connected to each other through a network. The plurality of the audio signal processing apparatuses are previously linked to form a zone and are defined as devices belonging to the zone, and further the devices are grouped into a plurality of device groups within the zone. Each of the plurality of the audio signal processing apparatuses includes a device group table that registers information specifying controls which are performed in each of audio signal processing apparatuses belonging to a device group in case that a group control command is given for collectively controlling the device group, and a master table that registers information specifying controls which are performed in each of the device groups included in the zone in case that a zone control command is given for collectively controlling the zone, whereby both the collective control of the zone and the collective control of the device group are performed. The configuration editing apparatus comprises a first display control section that displays an overall configuration of the devices of the zone on a screen, and a second display control section that displays respective configurations of the devices of the device groups included in the zone on the same screen.

Preferably, the second display control section displays the respective configurations of the devices of the device groups in colors specified respectively for the device groups. The configuration editing apparatus may further comprises an issuing section that issues an instruction to add a graphic element representative of a new device on the screen, and a specifying section operative when the instruction to add a graphic element of a new device has been issued, for specifying whether the new device belongs to an existing device group or to a new device group and inputting a corresponding device group name when the new device has been specified as belonging to the new device group.

According to the present invention, in the case where an audio signal processing system is constructed by combining a plurality of audio signal processing apparatuses, it is possible to construct a plurality of groups involving arbitrary audio signal processing apparatuses. When a control command or a recall command is given on a zone basis, it is possible to perform synchronous control of a plurality of groups belonging to the corresponding zone. On the other hand, when a control command or a recall command is given on a device group basis, it is possible to only interlock devices involved in the corresponding device group alone without affecting the other device groups. Accordingly, it is possible to perform collective scene recall of a plurality of groups and also to perform scene recall of devices of a specific group alone without affecting the other groups.

According to the present invention, in the case where a mixer system is constructed by combining a plurality of mixing engines, even when a plurality of groups is constructed of arbitrary mixing engines, all the configurations of the plurality of device groups are viewed as a whole on a single screen, since the entirety is defined as a zone and the plurality of device groups are defined as being included in the zone. Particularly, even when devices belonging to the same device group are located at distant positions, they can be identified as belonging to the same device group at a glance since the devices of each device group are displayed in a color specified individually for the device group. In addition, when an instruction to add a graphic element representative of a new device has been issued, it is specified whether the new device belongs to an existing device group or to a new device group and a corresponding device group name is inputted when the new device has been specified as belonging to a new device group. Accordingly, each device always belongs to any device group, thereby realizing display of configurations of devices easy to view as a whole.

BRIEF DESCRIPTION OF THE DRAWINGS

FIGS. 3A to 3D illustrate configurations of scene tables.

FIG. 17 is a flow chart illustrating a procedure when the display color of devices on the CAD screen is changed at a later time.

DETAILED DESCRIPTION OF THE INVENTION

Figure 18A:
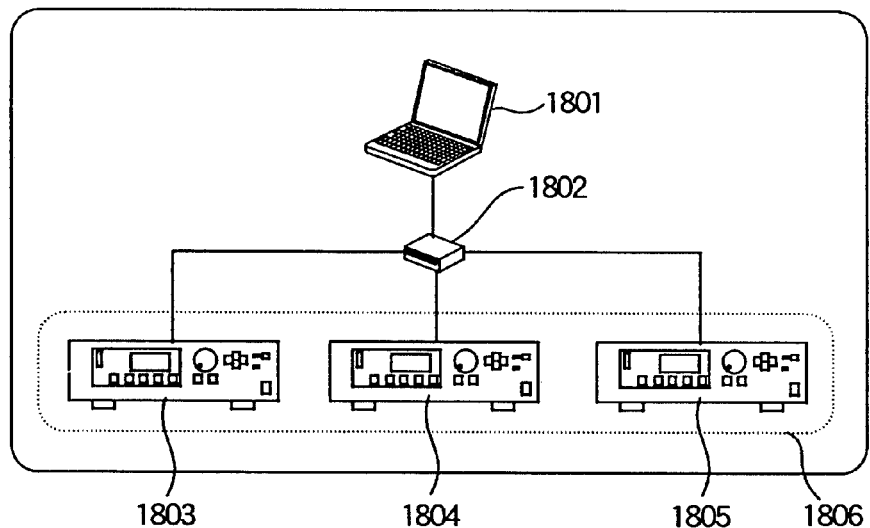
FIGS. 18A and 18B illustrate an example construction of a single zone using three mixing engines.

First, we describe a general concept of zone in detail. FIG. 18 illustrates an example construction of a single zone using three mixing engines. A PC 1801 is connected to three mixing engines 1803 to 1805 through a switching hub 1802. The three mixing engines 1803 to 1805 constitute one zone 1806. A zone must include a device which is referred to as a zone master and the other devices in the zone are referred to as slaves. For example, in FIG. 18A, the mixing engine 1803 is a zone master and the mixing engines 1804 and 1805 are slaves. The slaves 1804 and 1805 can be controlled from the zone master 1803. All the devices in the zone can also be controlled from the PC 1801 giving instructions to the zone master 1803.

Figure 18B:
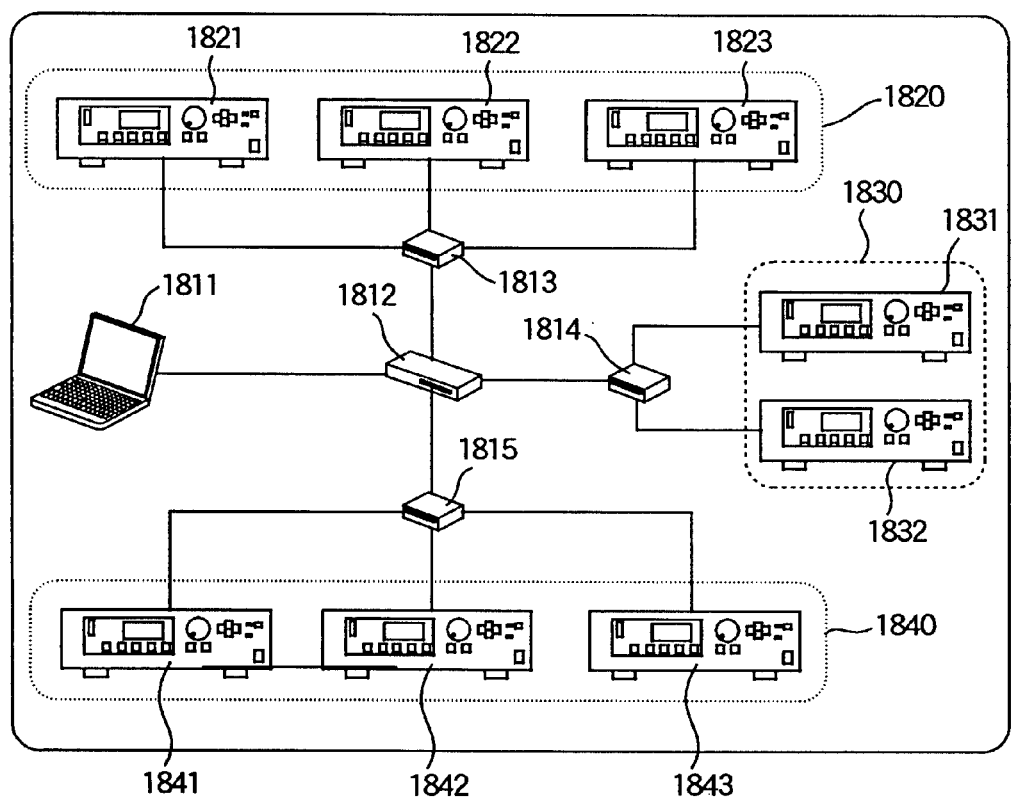

FIG. 18B illustrates an example setting of a plurality of zones. Three mixing engines 1821 to 1823 are connected to a switching hub 1813 to constitute a zone 1820. Similarly, two mixing engines 1831 and 1832 constitute a zone 1830 and three mixing engines 1841 and 1843 constitute a zone 1840. One zone master is present in each zone as described above. The switching hubs 1813 to 1815 are connected to a router 1812 and a PC 1811 is connected to the router 1812.

FIGS. 18A and 18B illustrate only the connection relationship of the control system of the mixer system. Although not illustrated, actually, connection lines that carry audio signals extend between the mixing engines and input lines of audio signals received from a microphone or the like and output lines to speakers, an amplifier, or the like are also provided. However, since this patent application relates to an invention that focuses on the control system of the mixer system, we will focus only on the control system of the mixer system in the following description without illustrating the transmission relationship of audio signals.

Although the zone can be defined in any way, we here assume that devices assigned an IP address of the same domain constitute one zone. Specifically, it is assumed that devices with the same class C network address are included in the same zone. Accordingly, one zone is composed of up to 256 devices and the connection between zones needs to be made through a router (for example, the router 1812 of FIG. 18B).

This zone setting makes it possible to operate devices in one zone in a cooperative manner. For example, when a scene is specified and recalled at any mixing engine included in a zone, the recalled scene is collectively set in all mixing engines in the zone. The term "scene" refers to a combination of a configuration and preset parameters. The term "configuration" refers to a combination of components for constructing a target mixer system. The term "components" refers to parts that perform signal processing or the like. Examples of the components include audio processors such as mixers, compressors, effects, and crossovers and operators or displays such as faders, switches, pan controls, and meters. By executing a specific mixer control program on a PC, the user can display a mixer editing screen, select and arrange arbitrary components on the screen, and establish connection lines between terminals of the components to define the input and output relationship of audio signals, thereby creating a configuration corresponding to a desired mixer structure. After the created configuration is compiled (i.e., converted into information interpretable by the mixing engine), it is transmitted from the PC to the mixing engine. The mixing engine calls and runs the configuration on its current memory, thereby realizing a mixer having a mixer structure defined by the configuration. The term "preset parameters" refers to a set of parameter data of the components of the mixer structure described above.

From the PC, it is possible to control the mixer system on a zone basis. For example, when the zone 1820 is specified and a scene recall instruction is issued at the PC 1811 of FIG.

18B, a configuration and preset parameters of the instructed scene are called and set in the mixing engines 1821 to 1823 of the zone 1820. Since zones are controlled completely independent of each other, an instruction for one zone does not affect other zones. In addition, an instruction for a zone is that for all devices in the zone. Therefore, when an instruction has been issued for a zone, a control operation according to the instruction is performed at all devices in the zone.

When a mixer system is constructed by combining a plurality of mixing engines in this manner, the mixer system may have functions to display a zone configuration screen representing the overall configuration to allow the user to view the connection relationship or the like of each mixing engine and to allow the user to connect lines between the variety of devices on the zone configuration screen and to create a screen representing the overall configuration.

Figure 19:
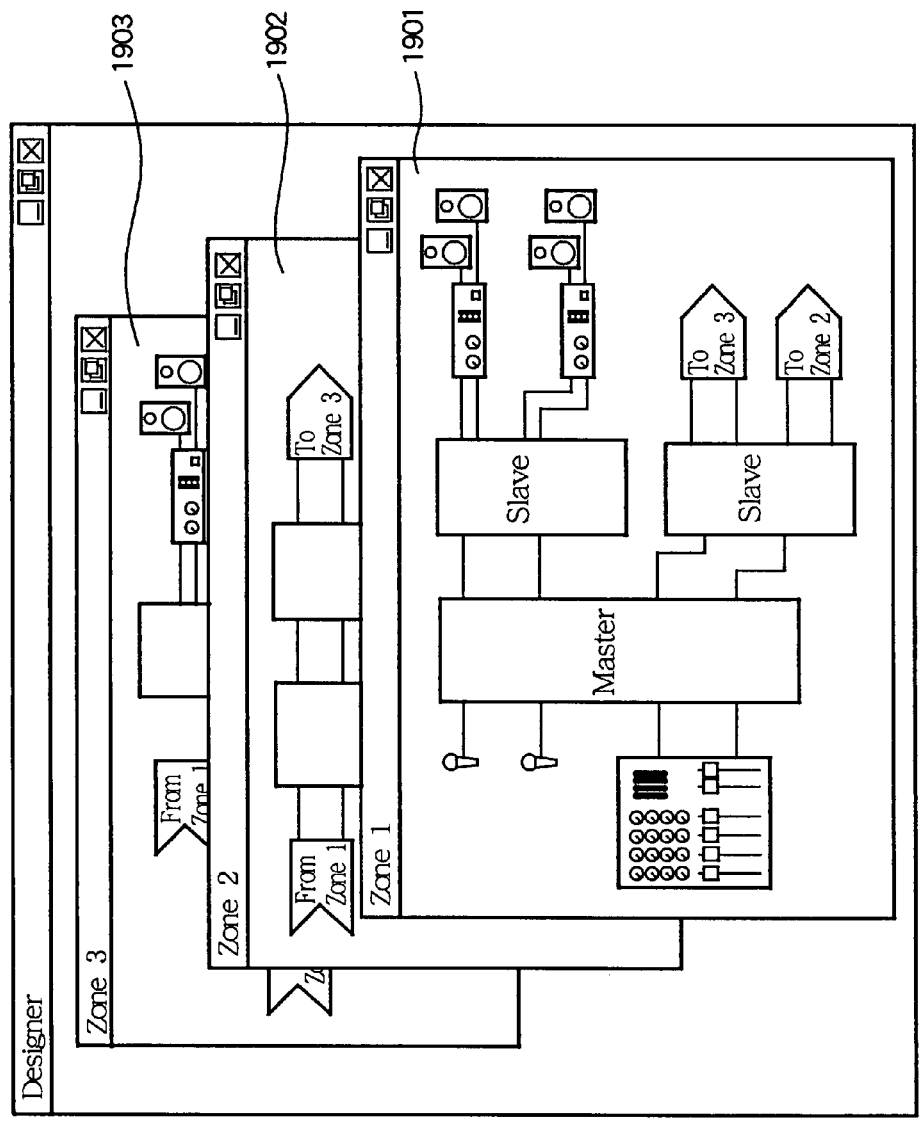
FIG. 19 illustrates example screenshots of zone configuration screens.

FIG. 19 illustrates example screenshots of respective zone configuration screens of the three zones of FIG. 18B. A zone configuration screen 1901 of Zone 1 (the zone 1820 of FIG. 18B), a zone configuration screen 1902 of Zone 2 (the zone 1830 of FIG. 18B), and a zone configuration screen 1903 of Zone 3 (the zone 1840 of FIG. 18B) are displayed on a main screen 1900.

Now, embodiments of the present invention will be described with reference to the drawings.

A mixer system (audio signal processing system) of this embodiment newly introduces a device group concept at a lower level of the zone. In the related art, only the zone is used as a unit for linking or synchronizing devices. However, the mixing engine of this embodiment uses a device group as the minimum unit for linking. A zone is composed of a plurality of device groups, and device groups in the same zone can communicate with each other. It is possible to make a setting for a specific scene such that a specific device in a device group is not affected by the specific scene. This makes it possible to use any number of devices included in a device group as the minimum unit for interlocking. A device group must include a device which is referred to as a group master and the other devices in the device group are referred to as slaves.

A group master in a device group knows information of the other device groups in the same zone. Each group master does not need to know information of all devices in the other device groups and only needs to know information of the group masters in the other device groups. This is because, when any control operation is performed in any device group, the group master gives instructions to slaves under its control. A table in which information of all masters is written is referred to as a master table. The master table is shared by all masters. This makes it possible to interlock devices of device groups.

In the following description, this embodiment will be exemplified by a scene master table which is a master table regarding scenes. That is, for scenes, this embodiment is provided with respective scene tables of device groups (referred to as "device group scene tables") and a combination of significant scenes (referred to as "device group scenes") of device groups registered in the device group scene tables. In short, this combination is that of IDs specifying device group scenes of device groups and is referred to as a "scene link". A table in which such scene links are registered is a scene master table. Any scene link registered in the scene master table can be set such that a specific device group scene is not recalled for the scene link. In addition, any device group scene registered in the device group scene table can be set such that the scene is not recalled for a specific device. These tables will be described in detail later.

Figure 1A:
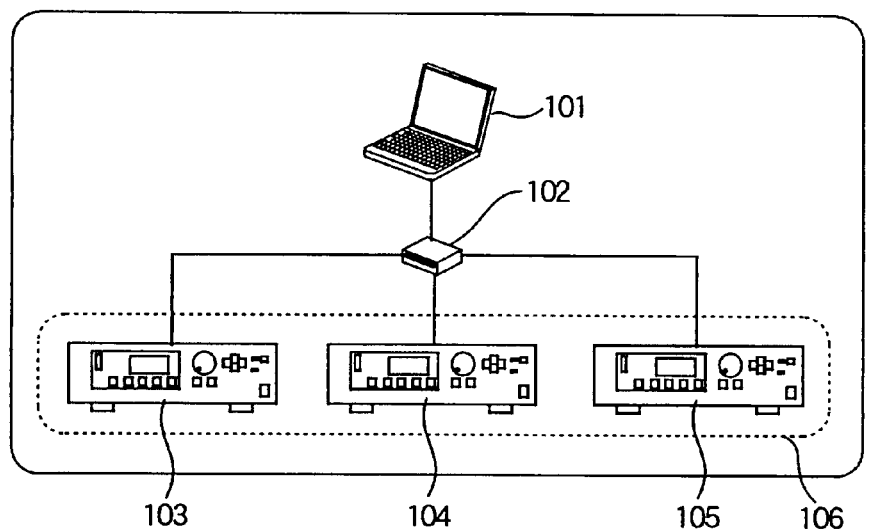
FIGS. 1A and 1B illustrate example device group configurations.

FIG. 1A illustrates an example construction of a single device group. Three mixing engines 103 to 105 are connected through a switching hub 102 to construct a single device group 106. A PC 101 is connected to the hub 102.

Figure 1B:
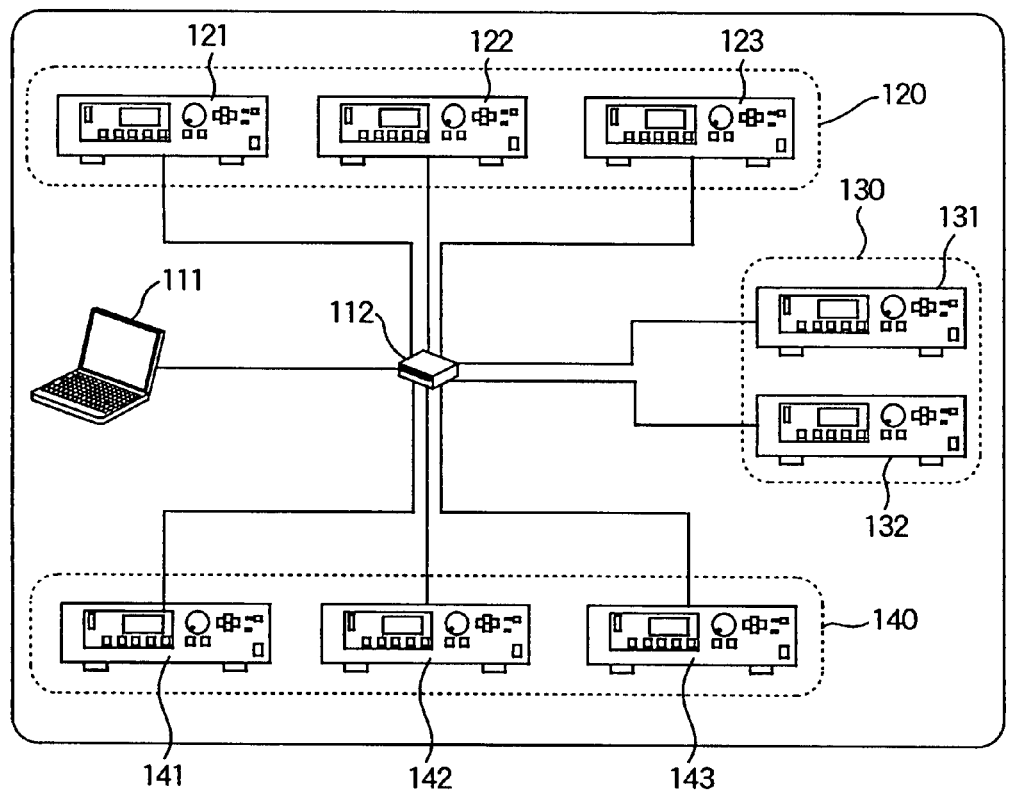

FIG. 1B illustrates an example construction of a plurality of device groups in a single zone. A device group 120 is constructed of three mixing engines 121 to 123, a device group 130 is constructed of two mixing engines 131 and 132, and a device group 140 is constructed of three mixing engines 141 to 143. These 8 mixing engines 121 to 123, 131, 132, and 141 to 143 are connected to a switching hub 112 and a PC 111 is connected to the hub 112. As described above in the "Description of the Related Art" section, devices having the same class C network address are included in the same zone. However, in FIG. 1B, the 8 mixing engines constitute a single zone and thus these mixing engines can be connected to each other through the switching hub 112. This can reduce the overall cost since there is no need to use the expensive router and the mixing engines can be connected to each other through the hub.

As described above, the minimum unit for synchronizing, linking or interlocking is one device group, and one zone is constructed of a plurality of device groups. In addition, since the zone is the same unit as a zone in the related art, it is possible to synchronize, link or interlock the plurality of device groups if they are operated on a zone basis. It is assumed that one group master is present in one device group. Communication between group masters of the plurality of device groups makes it possible to communicate with another interlocking unit without leaving the zone. When the system starts up, the devices perform communication for initialization with each other. It is assumed that all devices in a device group share information indicating which device in the device group is a group master and which devices are slaves and it is also assumed that the group master of each device group shares information indicating which devices are the respective group masters of all device groups present in the zone.

Figure 2:
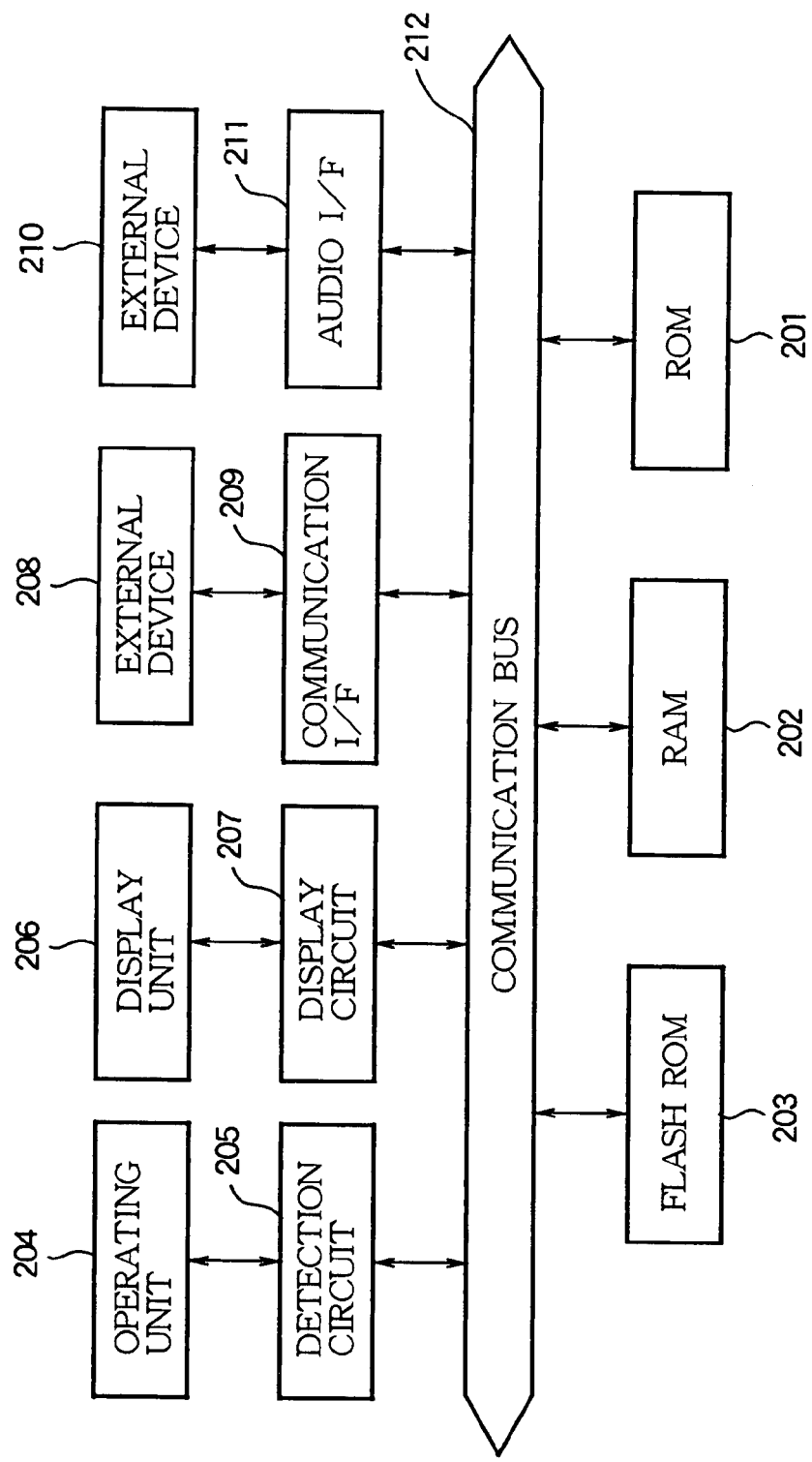
FIG. 2 illustrates a hardware structure of a mixing engine.

FIG. 2 illustrates a hardware structure of each mixing engine of FIG. 1. The mixing engine includes a central processing unit (CPU) 201, a random access memory (RAM) 202, a flash read only memory (ROM) 203, an operating unit 204, a detection circuit 205, a display unit 206, a display circuit 207, an external device 208, a communication interface (I/F) 209, an external device 210, an audio interface 211, and a communication bus 212.

The CPU 201 is a processing unit that controls the overall operation of the mixing engine. The RAM 202 is a volatile memory into which a program to be executed by the CPU 201 is loaded and in which a variety of buffer regions are secured. The flash ROM 203 is a rewritable, nonvolatile memory which stores a variety of information such as a scene table described later. The operating unit 204 includes a variety of operators such as buttons and a wheel provided on an external panel of the mixing engine. The detection circuit 205 detects operations of the operating unit 204 and transmits the detection result to the CPU 201. The display unit 206 is a display provided on the external panel of the mixing engine to display a variety of information. The display circuit 207 receives an instruction from the CPU 201 and transmits display data to the display unit 206 to cause it to display the display data. The communication interface 209 is a local area network (LAN) interface for connection to the external device 208. In FIG. 1A, each mixing engine is connected to the bus 102 and, in FIG. 1B, each mixing engine is connected to the hub 112. However, this mixing engine is connected to a hub through the communication interface 209. The audio interface 211 is an interface for connection to the external device 210.

Although FIG. 1 shows only the connection relationship in the control system without showing the connection relationship for transmitting audio signals, actually, connection lines or the like, which allow the mixing engines to exchange audio signals, extend between the mixing engines. The audio interface 211 is an interface for communicating these audio signals. In addition to the components shown in FIG. 2, the mixing engine also includes a DSP for performing audio signal processing, which however is not illustrated.

The hardware structure of the PCs 101 and 111 of FIG. 1 is similar to that shown in FIG. 2. In the case where the structure of FIG. 2 is considered that of the PCs 101 and 111, the audio interface 211 is not necessary if no audio signal processing is performed at the PC. The flash ROM may be a general ROM and is generally connected to an auxiliary storage device such as a hard disk. The operating unit 204 is a keyboard or mouse and the display unit 206 is a display larger than that of the mixing engine since it is a PC display.

Scene tables will now be described with reference to FIGS. 3A to 3D. FIGS. 3C and 3D illustrate scene tables for the conventional mixer system. For example, the scene table of FIG. 3C is the same as that of the zone 1820 of FIG. 18B and the scene table of FIG. 3D is the same as that of the zone 1840 of FIG. 18B. The scene table of FIG. 3C is created by executing a specific mixer control program on the PC 1811. The created scene table is transmitted from the PC 1811 to the mixing engines 1821 to 1823 in the zone 1820 and is then stored in the respective flash ROMs 203 of the mixing engines 1821 to 1823. For example, if it is assumed that Scene No. 001 has been recalled through a manipulation of any mixing engine in the zone 1820 or through a manipulation from the PC 1811 with the zone 1820 specified, each of the mixing engines 1821 to 1823 refers to the table of FIG. 3C and reads Config01 to set it as a mixer configuration of each mixing engine. In addition, the mixing engine 1821 which is the zone master reads and sets Preset001 as a parameter, the mixing engine 1822 which is Slave1 reads and sets Preset001 as a parameter, and the mixing engine 1823 which is which is Slave2 reads and sets Preset002 as a parameter. Config01 and Config02 are file names of configuration files, each of which is substantial data regarding both the line connection relationship and the combination of components. The configuration file which is substantial data is previously created by the mixer control program on the PC 1811 and transmitted to each of the mixing engines 1821 to 1823. The same is true for preset files such as Preset001.

The scene table of FIG. 3D is also similar to that of FIG. 3C. Since the scene table of FIG. 3C is that of the zone 1820 and the scene table of FIG. 3D is that of the zone 1840, the scene tables of FIGS. 3C and 3D generally have different content even for the same scene number (Scene No). Although some configuration or preset files of FIGS. 3C and 3D have the same file names, they also generally have different content.

In contrast to such conventional scene tables, the mixing engines of this embodiment have scene tables as shown in FIGS. 3A and 3B.

FIG. 3A illustrates a scene table (device group scene table) of a device group for performing scene recall synchronizing, linking or interlocking on a device group basis. This table has the same structure as that of the conventional zone-based scene table of FIG. 3C or 3D. The same description as that of FIG. 3C or 3D is applied to this table with "scene" replaced with "device group". However, while a preset file corresponding to each mixing engine must be specified in the conventional scene table, no preset file is specified and instead "-" is written in part of the device group scene table of FIG. 3A according to this embodiment. This means that, when a scene number has been recalled, no configuration and preset recall is performed on each mixing engine with "-" written in its preset entry (i.e., its current state is left unchanged).

This device group scene table is stored in every mixing engine of the device group. Therefore, if a scene number is specified and a recall instruction is issued through a manipulation of any mixing engine in the device group or through a manipulation from the PC with the device group specified, the corresponding scene recall is performed in an interlocking manner for all mixing engines (other than the mixing engine with "-" specified its entry in the table) in the device group. Each mixing engine only needs to store a device group scene table of a device group to which it belongs and does not need to store device group scene tables of other device groups.

FIG. 3B illustrates a scene table (scene master table) for performing scene recall interlocking on a zone basis. Scene links, each of which is a combination of scene numbers to be recalled for the device groups, are registered in association with scene link numbers in the scene master table. For example, this scene master table is created by executing a specific mixer control program on the PC 111 of FIG. 1B. The created scene master table is transmitted from the PC 111 to respective group masters of all device groups and is also transmitted to all slaves of the device groups via the group masters. As a result, the created scene master table is stored in flash ROMs 203 of all mixing engines in the zone. If a scene link number is specified and a zone recall instruction is issued through a manipulation of any mixing engine in the single zone of FIG. 1B or through a manipulation from the PC 111 with the zone specified, the group master of each device group obtains a scene corresponding to a scene number specified in the device group through a scene link corresponding to the specified scene link number, with reference to the device group scene table, and recalls the obtained scene in the device group. Accordingly, scene recall is performed in an interlocking manner in all device groups of the zone.

No scene number is written and instead "-" is written in part of each scene link registered in the scene master table. This means that, when a scene link has been recalled, no recall is performed on a device group with the symbol "-" rather than a scene link number written in its entry (i.e., its current state is left unchanged). This makes it possible to achieve scene recall interlocking any device groups in the zone.

A procedure of manipulations to instruct scene recall in each mixing engine of the mixer system of this embodiment will now be described.

Figure 4A:
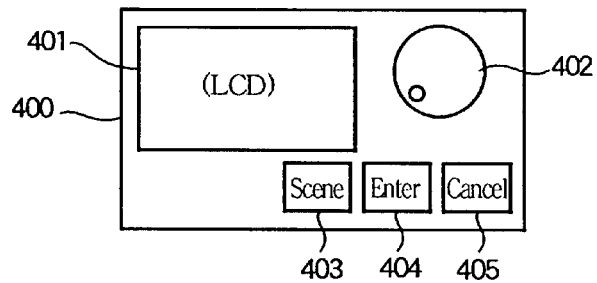
FIGS. 4A to 4C illustrate an appearance of a part of an external panel of a mixing engine and menus on the external panel.
Figure 4B:
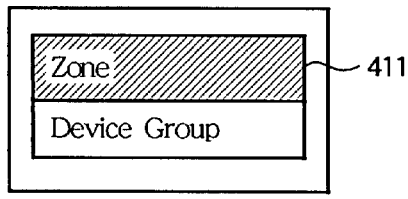
Figure 4C:
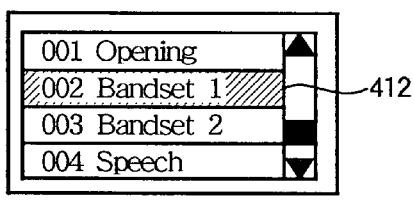

FIG. 4A illustrates an appearance of (part of) an external panel of the mixing engine of this embodiment. A liquid crystal display (LCD) 401 corresponding to the display unit 206 and a wheel 402, a scene button 403, an enter button 404, and a cancel button 405 corresponding to the operating unit 204 are provided on the external panel 400. When the scene button 403 is pressed, a menu 411 shown in FIG. 4B is displayed on the LCD 401. The menu 411 is used to select whether the scene to be recalled is a zone scene or a device group scene. The zone scene is a scene of any scene link registered in the scene master table of FIG. 3B. The device group scene is any scene registered in the device group scene table of FIG. 3A (which is that of a device group including a mixing engine with the scene button 403 pressed). When the wheel 402 is operated to select one of Zone or Device Group in the menu 411 and the enter button 404 is then pressed, a menu as shown in FIG. 4C is displayed. When "Zone" has been selected from the menu 411, the menu 412 provides a list of scene links registered in the scene master table of FIG. 3B. When "Device Group" has been selected from the menu 411, the menu 412 provides a list of scenes registered in the device group scene table of FIG. 3A. A scene or a scene link is recalled by selecting the scene or scene link from the menu 412 and then pressing the enter button 404. Names are assigned to the scenes or scene links listed in the menu 412. Here, it is assumed that the user arbitrarily assigns the names.

Figure 5:
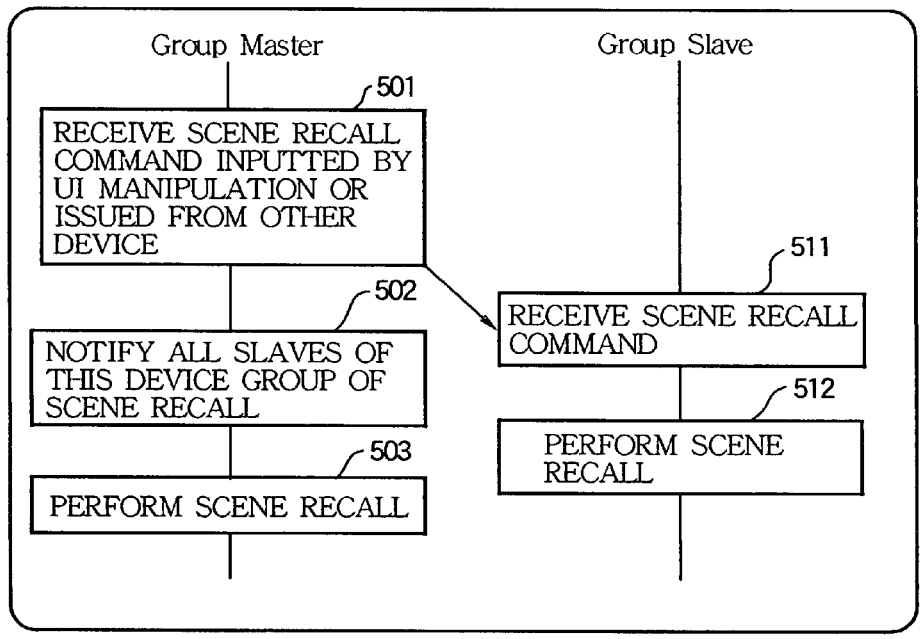
FIG. 5 illustrates a first procedure of operations of a group master and slave when scene recall is performed.

FIG. 5 illustrates a procedure of operations of a group master and slave in the case where a group master of a device group performs scene recall in the device group (when "Device Group" has been selected from the menu of FIG. 4B). At step 501, the group master receives a recall instruction issued by the user interface (UI) manipulations described above with reference to FIGS. 4A and 4B or receives a scene recall command transmitted from the PC 101. At step 502, the group master notifies all slaves of the device group of the received scene recall instruction or command. Thereafter, at step 503, the group master performs scene recall in its own device. At step 511, each slave of the device group receives the scene recall instruction. At step 512, the slave recalls the instructed scene.

Figure 6:
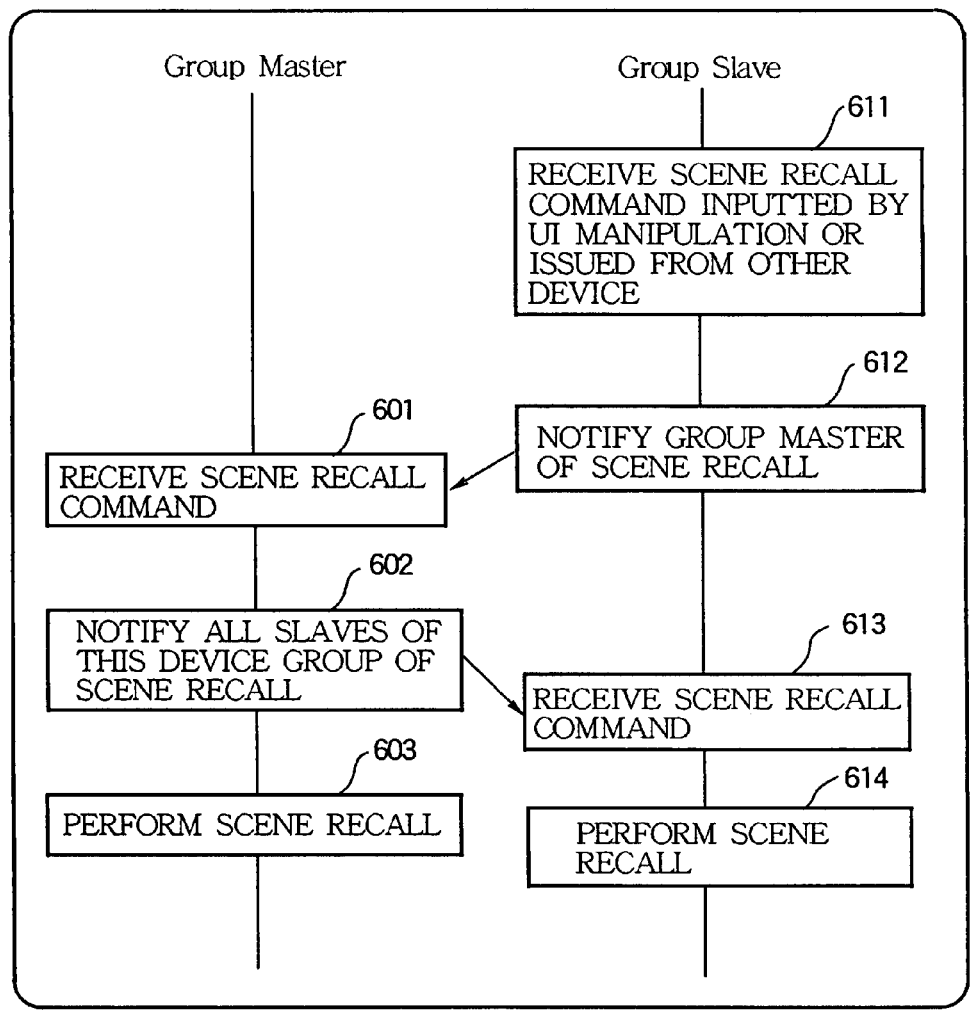
FIG. 6 illustrates a second procedure of operations of a group master and slave when scene recall is performed.

FIG. 6 illustrates a procedure of operations of a group master and slave in the case where a slave of a device group performs scene recall in the device group (when "Device Group" has been selected from the menu of FIG. 4B). At step 611, the slave receives a recall instruction issued by the UI manipulations described above with reference to FIGS. 4A and 4B or receives a scene recall command transmitted from the PC 101. At step 612, the slave notifies its group master of the received scene recall instruction. The group master receives the notification at step 601 and notifies all slaves of its device group of the scene recall instruction at step 602. Thereafter, at step 603, the group master performs the instructed scene recall in it. On the other hand, each slave (i.e., every slave of the device group) receives the scene recall instruction from the group master at step 613 and recalls the instructed scene in its own device at step 614.

Figure 7:
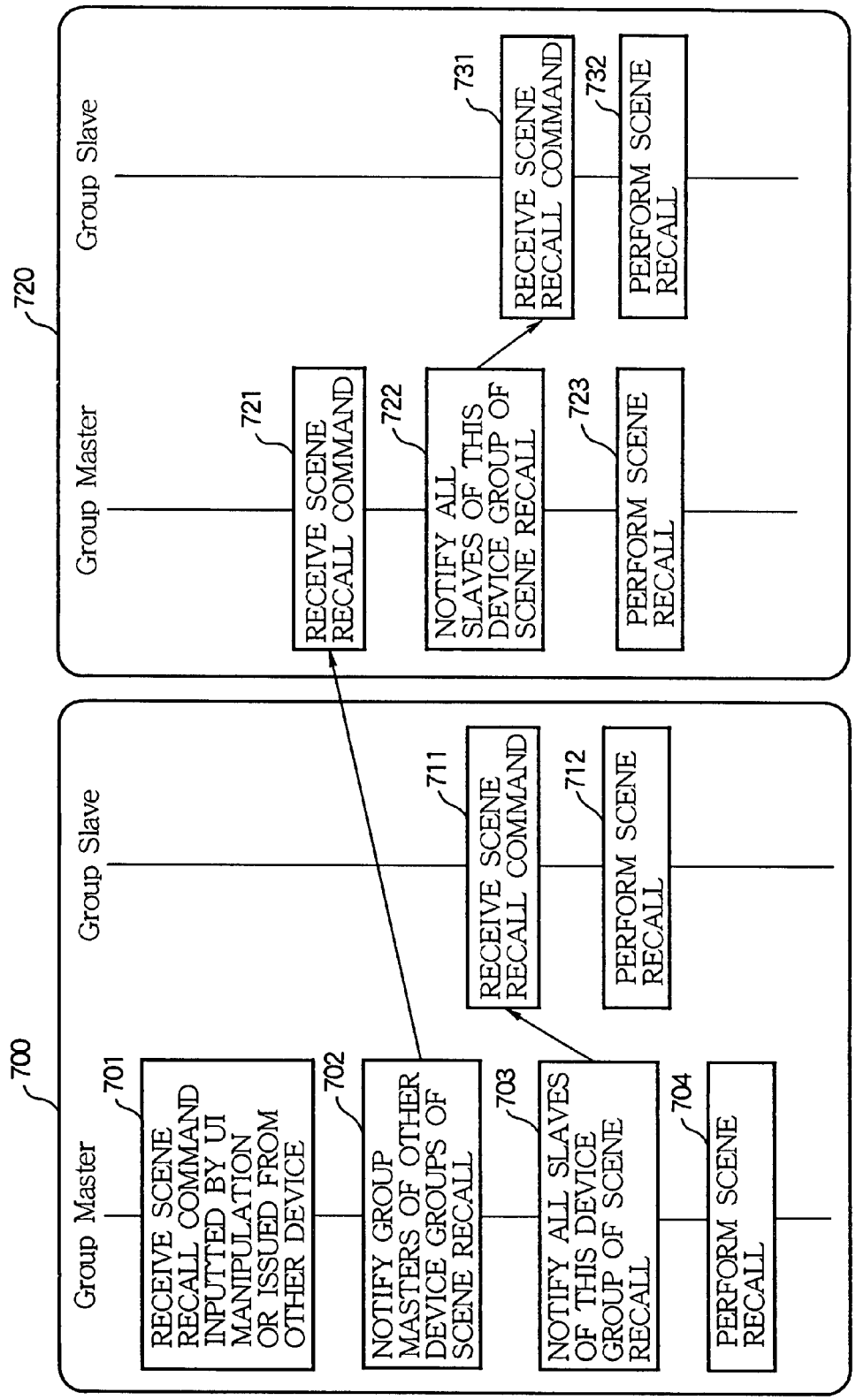
FIG. 7 illustrates a third procedure of operations of a group master and slave when scene recall is performed.

FIG. 7 illustrates a procedure of operations of a group master and slave in the case where a plurality of device groups is present and a group master of a device group performs scene recall in a zone (when "Zone" has been selected from the menu of FIG. 4B). At step 701, a group master of a device group 700 receives a recall instruction issued by the UI manipulations described above with reference to FIGS. 4A and 4B or receives a scene recall command transmitted from the PC 101. At step 702, the group master notifies respective group masters of other device groups of the scene recall instruction for the scene recall to be performed at the group masters. The subsequent steps 703, 704, 711, and 712 are similar to the above steps 502, 503, 511, and 512 of FIG. 5, respectively.

Each of the group masters of the other device groups 720, which have received the notification of step 702, receives the scene recall instruction at step 721. The subsequent steps 722, 723, 731, and 732 are similar to the above steps 502, 503, 511, and 512 of FIG. 5, respectively.

Figure 8:
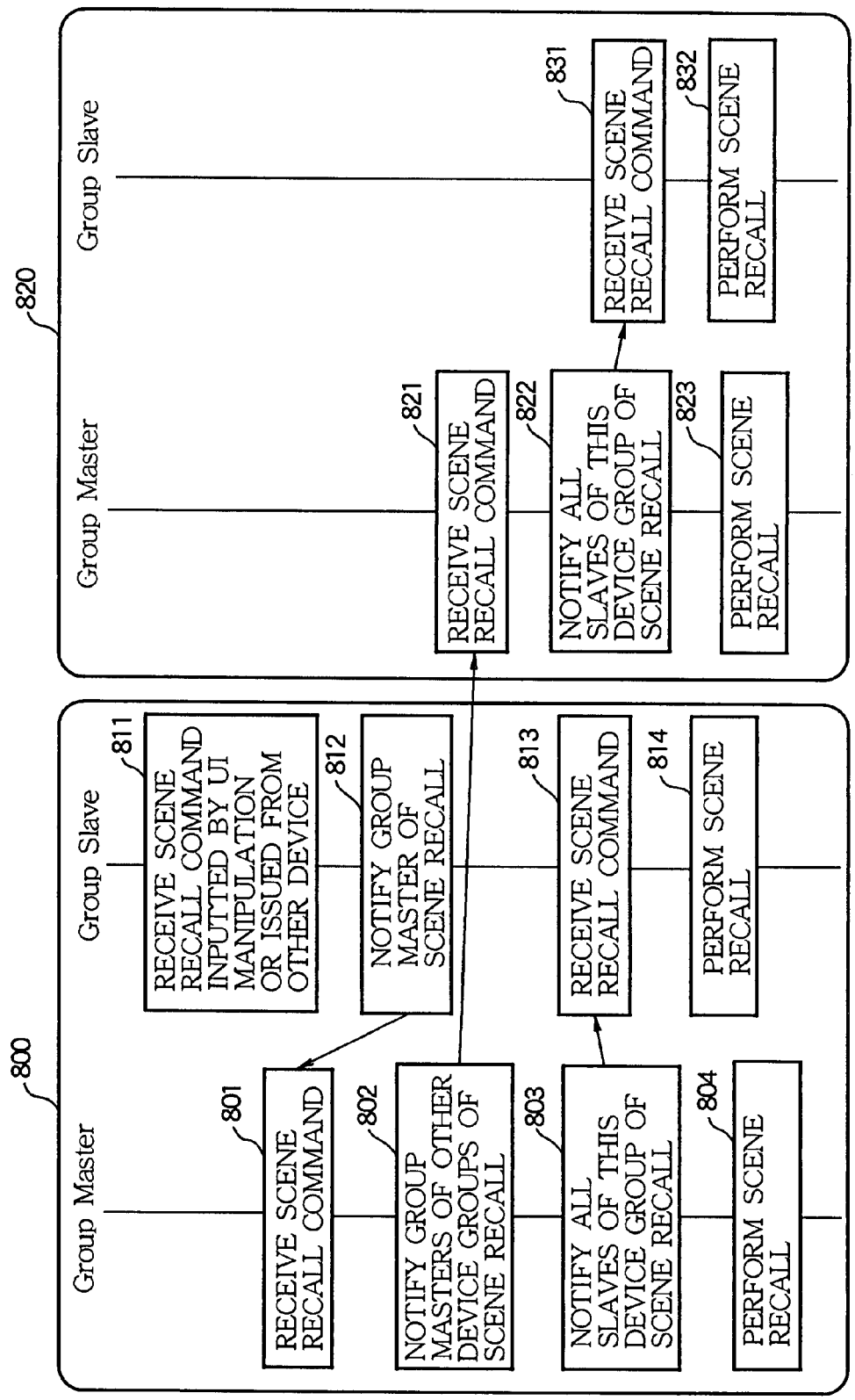
FIG. 8 illustrates a fourth procedure of operations of a group master and slave when scene recall is performed.

FIG. 8 illustrates a procedure of operations of a group master and slave in the case where a plurality of device groups is present and a slave of a device group performs scene recall in a zone (when "Zone" has been selected from the menu of FIG. 4B). At step 811, a slave of a device group 800 receives a recall instruction issued by the UI manipulations described above with reference to FIGS. 4A and 4B or receives a scene recall command transmitted from the PC 101. At step 612, the slave notifies a group master of its device group of the scene recall instruction. The group master receives the scene recall notification at step 801. The subsequent steps 802, 803, 804, 813, and 814 of the device group 800 are similar to the above steps 702, 703, 704, 711, and 712 of FIG. 7. Steps 821, 822, 823, 831, and 832 of another device group 820 are similar to the above steps 721, 722, 723, 731, and 732 of FIG. 7.

As can be seen from FIGS. 5 to 8, the control procedure in the device group in this embodiment is performed such that, first, the group master is notified of the instruction and the group master then notifies slaves in its group of the instruction.

Figure 9:
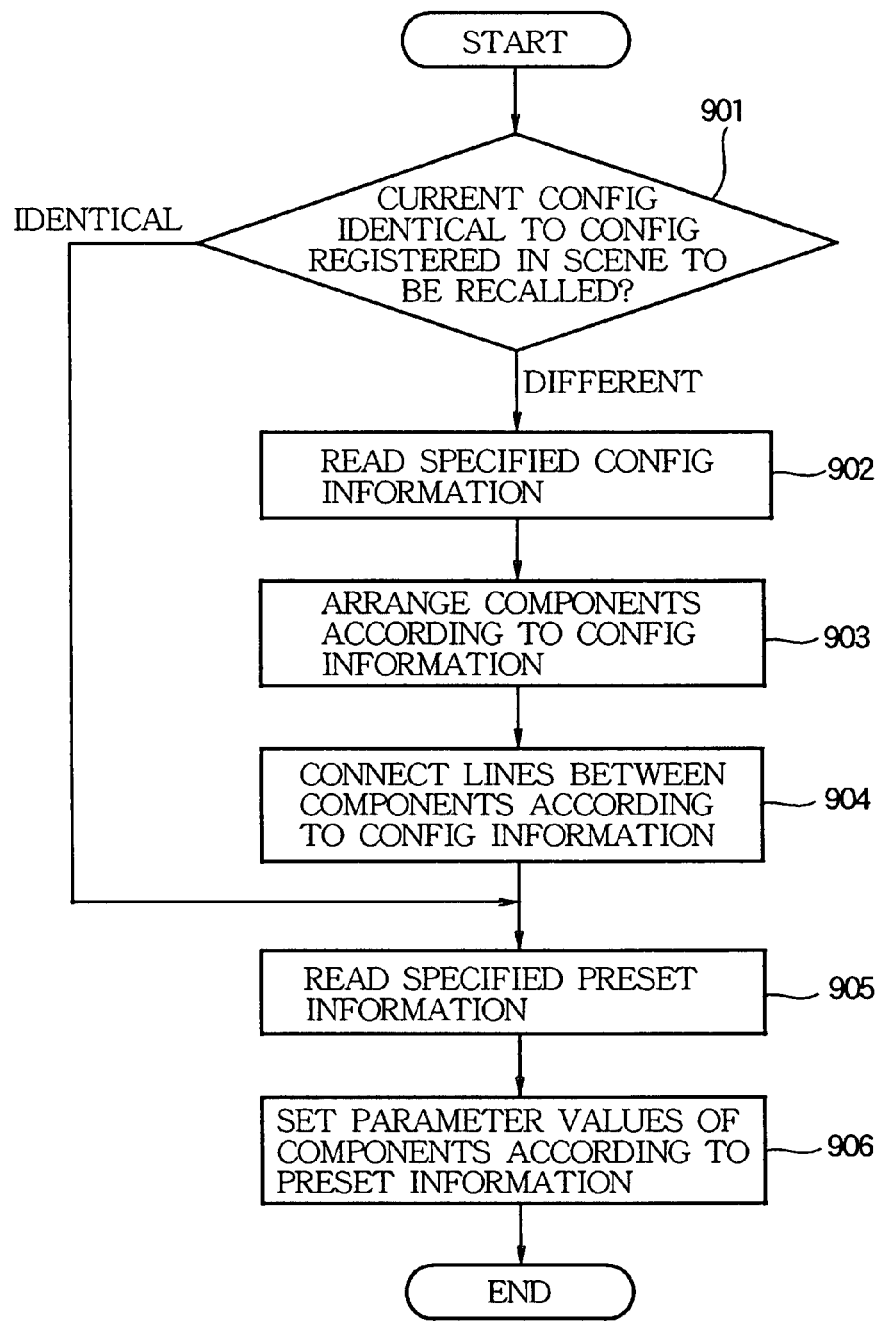
FIG. 9 is a flow chart illustrating a scene recall procedure.

FIG. 9 illustrates a procedure for scene recall in each mixing engine. This procedure is performed at each of the steps 503 and 512 of FIG. 5, the steps 603 and 614 of FIG. 6, the steps 704, 712, 723, and 732 of FIG. 7, and the steps 804, 814, 823, and 832 of FIG. 8.

At step 901, it is determined whether or not a mixer configuration currently set in the mixing engine is the same as a configuration registered in a scene to be recalled. If both the configurations are different, at step 902, configuration information of the scene to be recalled is read from a device group scene table (see FIG. 3A) in this device (i.e., the mixing engine). Then, components are arranged according to the configuration information at step 903 and line connections are established between the components according to the configuration information at step 904. The procedure then proceeds to step 905. Specifically, the processes of steps 903 and 904 are those for loading a microprogram, which performs audio signal processing according to the configuration information, into a DSP in the mixing engine. If both the configurations are identical at step 901, the procedure directly proceeds to step 905. At step 905, preset information of the scene to be recalled is read from the device group scene table. At step 906, parameter values of the components are set according to the preset information. Then, the procedure is terminated.

Figure 10:
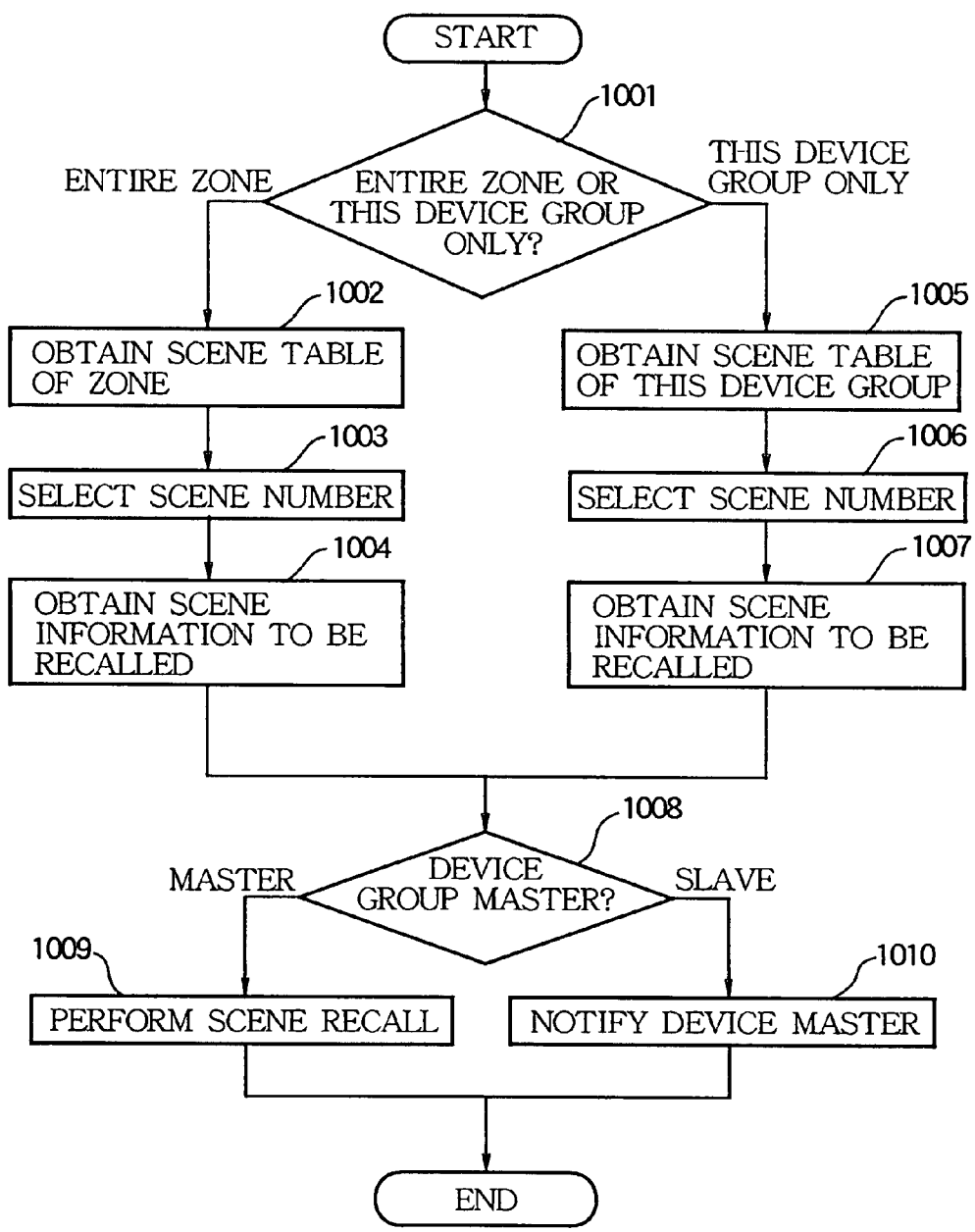
FIG. 10 is a flow chart illustrating a procedure of a routine for scene switching according to UI manipulations.

FIG. 10 illustrates a procedure of a routine for scene switching according to UI manipulations described above in FIGS. 4A and 4B. This procedure is activated when the scene button 403 of FIG. 4A is pressed. This procedure is initiated at each of the step 501 of FIG. 5, the step 611 of FIG. 6, the step 701 of FIG. 7, and the step 811 of FIG. 8. The same procedure is performed when a scene recall command is received from the PC. However, we assume here that this procedure uses instruction information issued through a command rather than through a selection manipulation by the user.

At step 1001, it is determined whether the entire zone or this device group alone is to be subjected to scene switching. If "Zone" is selected from the menu 411 of FIG. 4B and the enter button 404 is pressed, then the procedure proceeds to step 1002. If "Device Group" is selected from the menu 411 and the enter button 404 is pressed, then the procedure proceeds to step 1005.

At step 1002, a scene table of the zone (i.e., the scene master table described with reference to FIG. 3B) is obtained and a list of scene links is displayed as in the menu 412 of FIG. 4C. At step 1003, a selected scene number (strictly, a selected scene link number) is obtained. Specifically, a scene number, which the user has selected by pressing the enter button 404 after selecting it from the menu 412, is obtained. At step 1004, scene information to be recalled is obtained and the procedure proceeds to step 1008. In this manner, a scene number (Scene No.) to be recalled in each device group is obtained.

At step 1005, a scene table of this device group (i.e., the device group scene table described with reference to FIG. 3A) is obtained and a list of scenes is displayed as in the menu 412 of FIG. 4C. At step 1006, a selected scene number (i.e., a scene number, which the user has selected by pressing the enter button 404 after selecting it from the menu 412) is obtained. At step 1007, scene information to be recalled is obtained and the procedure proceeds to step 1008. In this manner, a scene number (Scene No.) to be recalled in this device group is obtained.

At step 1008, it is determined whether or not this device is a group master. When this device is a group master, scene recall (i.e., the procedure of FIG. 11) is performed at step 1009 and the procedure is then terminated. When this device is a slave, it provides a notification to a device master of its group at step 1010 and the procedure is then terminated. The notification of step 1010 corresponds to that of step 612 of FIG. 6 and step 812 of FIG. 8.

Figure 11:
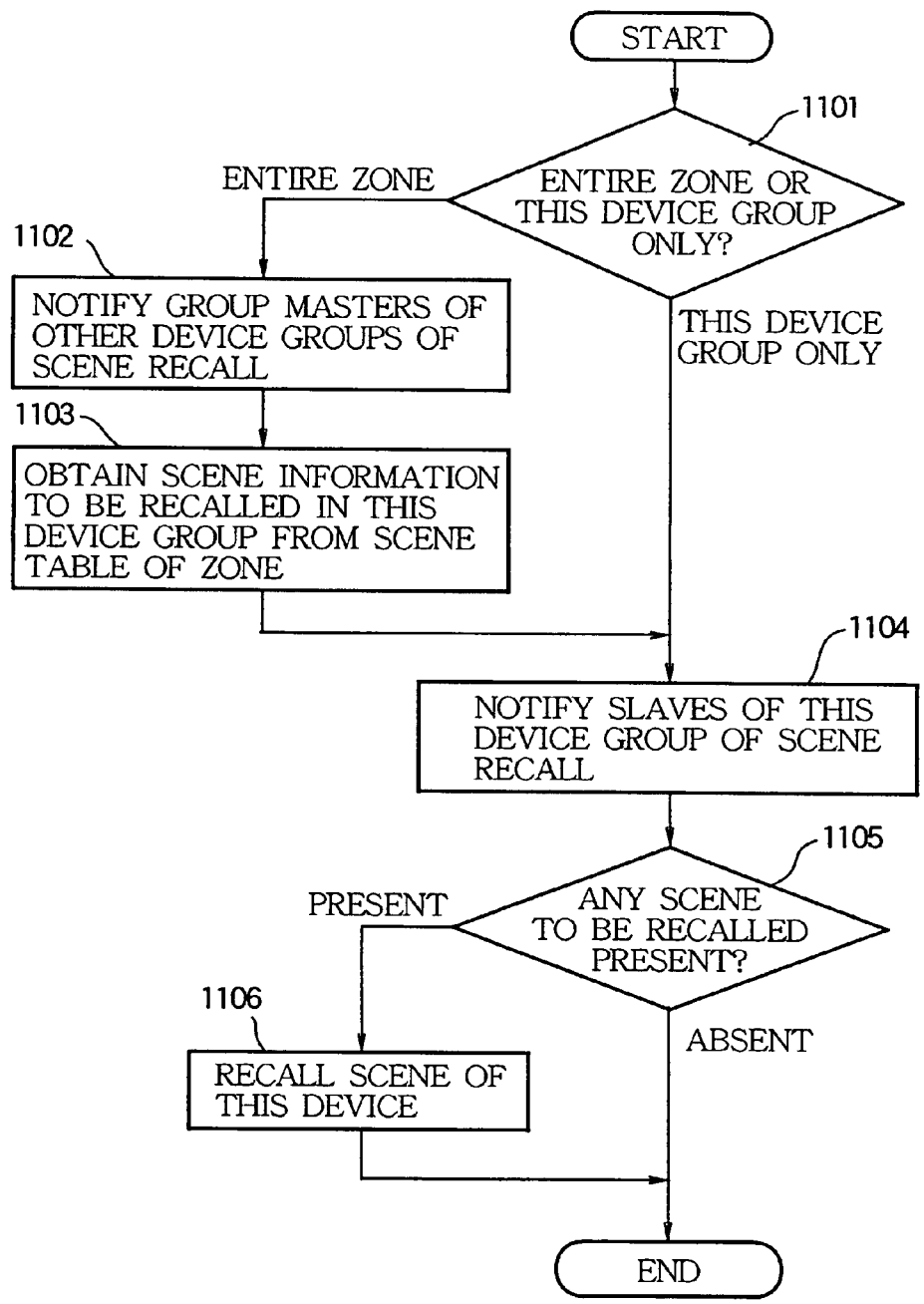
FIG. 11 is a flow chart illustrating a detailed procedure shown in FIG. 10.

FIG. 11 illustrates a detailed procedure of step 1009 in FIG. 10. At step 1101, it is determined whether the entire zone or the corresponding device group alone is to be subjected to scene recall. If the entire zone is to be subjected to scene recall (i.e., when the steps 1002 to 1004 of FIG. 10 have been performed), the group masters of other device groups are notified of the scene recall at step 1102. Here, since a scene number (Scene No.) to be recalled in each device group has been obtained at step 1004, the group master of each device group is notified of the scene number to be recalled in the device group at step 1102. At step 1103, a scene number to be recalled in the corresponding device group is obtained from the scene master table. Actually, since scene numbers to be recalled in the device groups have been obtained at step 1004, it is only necessary to obtain a scene number to be recalled in the corresponding device group from the obtained scene numbers at step 1103. The procedure then proceeds to step 1104. If it is determined at step 1101 that the corresponding device group alone is to be subjected to scene recall (i.e., when the steps 1005 to 1007 of FIG. 10 have been performed), the procedure directly proceeds to step 1104. At step 1104, slaves of the corresponding device group are notified of scene recall. Here, since a scene number to be recalled in the corresponding device group has already been obtained, the slaves are notified of the scene number so as to be instructed to perform the scene recall. At step 1105, it is determined whether or not any scene (configuration and preset information) to be recalled is present. If any scene to be recalled is present, the scene is recalled in the corresponding device at step 1106 and the procedure is then terminated. If no scene to be recalled is present, the procedure is immediately terminated. At step 1106, the procedure of FIG. 9 is performed.

The notification of the step 1102 corresponds to each of the step 702 of FIG. 7 and the step 802 of FIG. 8. The notification of the step 1104 corresponds to each of the step 502 of FIG. 5, the step 602 of FIG. 6, the steps 703 and 722 of FIG. 7, and the steps 803 and 822 of FIG. 8. Upon receiving the notification of step 1102, the group masters of the other device groups (the group master of the group 720 of FIG. 7 or the group master of the group 820 of FIG. 8) perform the procedure of FIG. 11.

Figure 12:
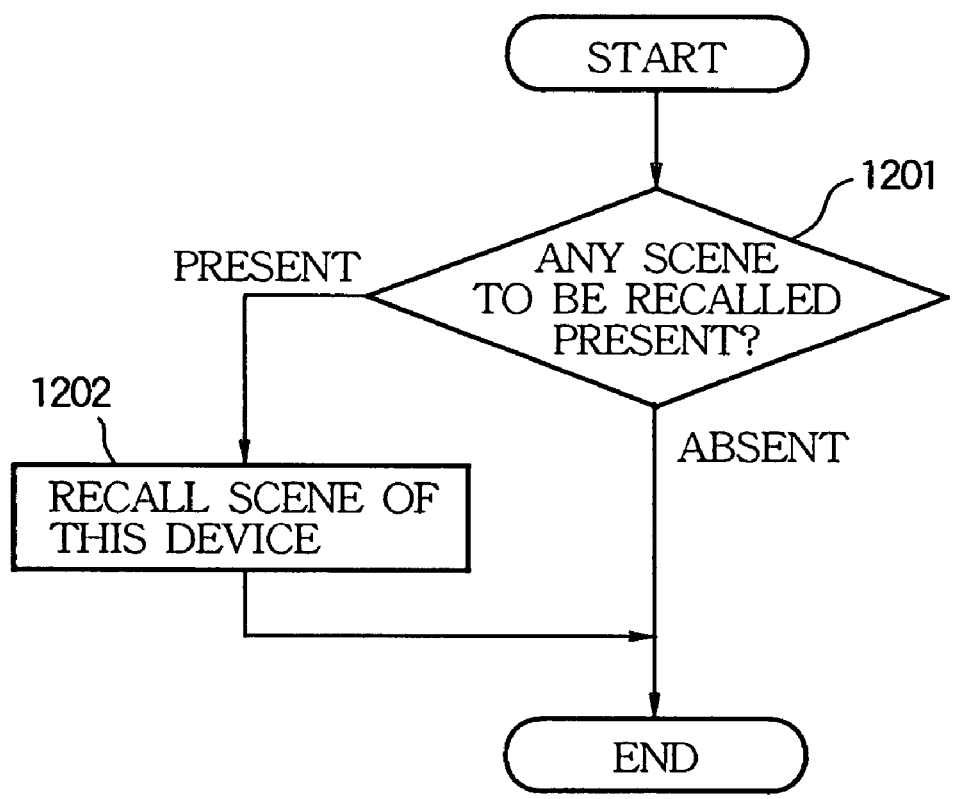
FIG. 12 is a flow chart of a scene recall routine for a slave of a device group.

FIG. 12 illustrates a scene recall routine for a slave of a device group. This procedure is performed at the slave that has received the notification of step 1104 of FIG. 11. This procedure is performed at the step 512 of FIG. 5, the step 614 of FIG. 6, the steps 712 and 732 of FIG. 7, and the steps 814 and 832 of FIG. 8. First, at step 1201, it is determined whether or not any scene to be recalled is present. If any scene to be recalled is present, the slave recalls the scene of its device at step 1202 and the procedure is then terminated. If no scene to be recalled is present, the procedure is immediately terminated.

A display editing function of the configuration of a zone in the mixer system of this embodiment will now be described. In the mixer system of this embodiment, control of the plurality of mixing engines can be performed from the PCs 101 and 111 shown in FIG. 1 and a mixer control program, which is executed on the PCs 101 and 111 for the control, includes the display editing function of the zone configuration. This function allows the user to arrange blocks representing mixing engines on a screen and to establish line connections representing the connection relationship between the mixing engines and thus to view the overall configuration of the mixer system at a glance. Particularly, with the introduction of the device group concept as described above, this embodiment employs an idea on the display to allow the user to identify, at a glance, which device groups the mixing engines arranged on the screen belong to. The following is a description of the display editing function of the zone configuration to which such an idea on the display is applied.

Figure 13:
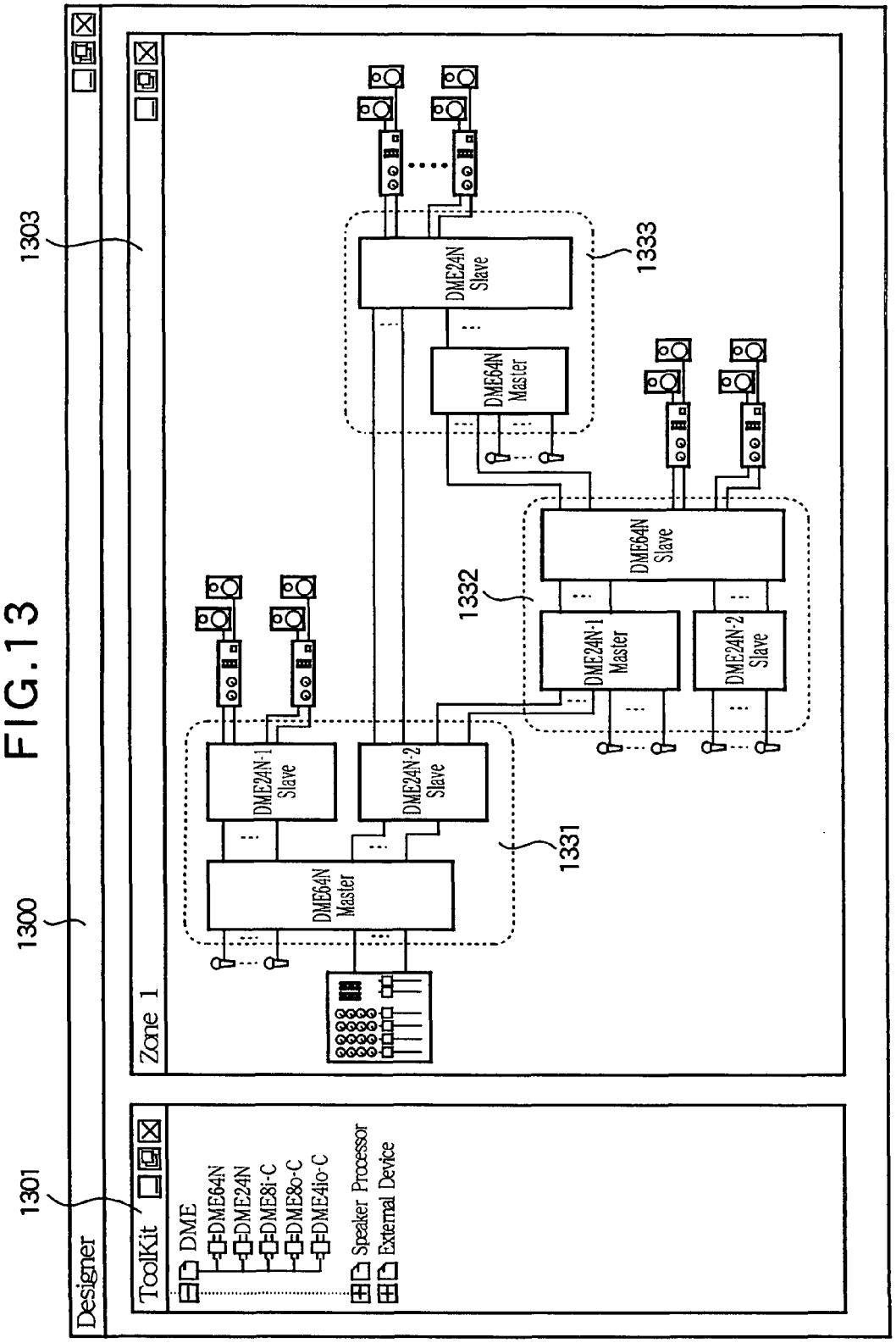
FIG. 13 illustrates an example screen that displays a configuration of the mixer system.

FIG. 13 illustrates an example screen that displays a configuration of the mixer system described with reference to FIG. 1 on the PC. A window for a tool kit 1301 and a window for an editing screen 1303 (hereinafter referred to as a CAD screen) are displayed in a main screen 1300. The CAD screen 1303 displays the configurations of devices in one zone. Here, device groups 1331 to 1333 are displayed in the CAD screen 1303. The user can select a mixing engine from the tool kit 1301 and can drag and drop the selected mixing engine into the screen 1303 to arrange it in the screen 1303. The user can also arrange elements other than mixing engines in the screen 1303 in the same manner and can arbitrarily establish line connections to create and edit a configuration diagram of the entire mixer system. When a new mixing engine is dragged and dropped into the CAD screen 1303, the new mixing engine can be called so as to be included in a specified device group and alternatively a new device group can be defined and the new mixing engine can then be called so as to be included the new device group. Generally, blocks of mixing engines belonging to the same device group are set to be displayed in the same color, except when manipulations have been performed to specify a displayed element and to change its color. This is advantageous in that it is possible to easily determine which mixing engines belong to the same device group even when they are displayed at distant positions.

Figure 14A:
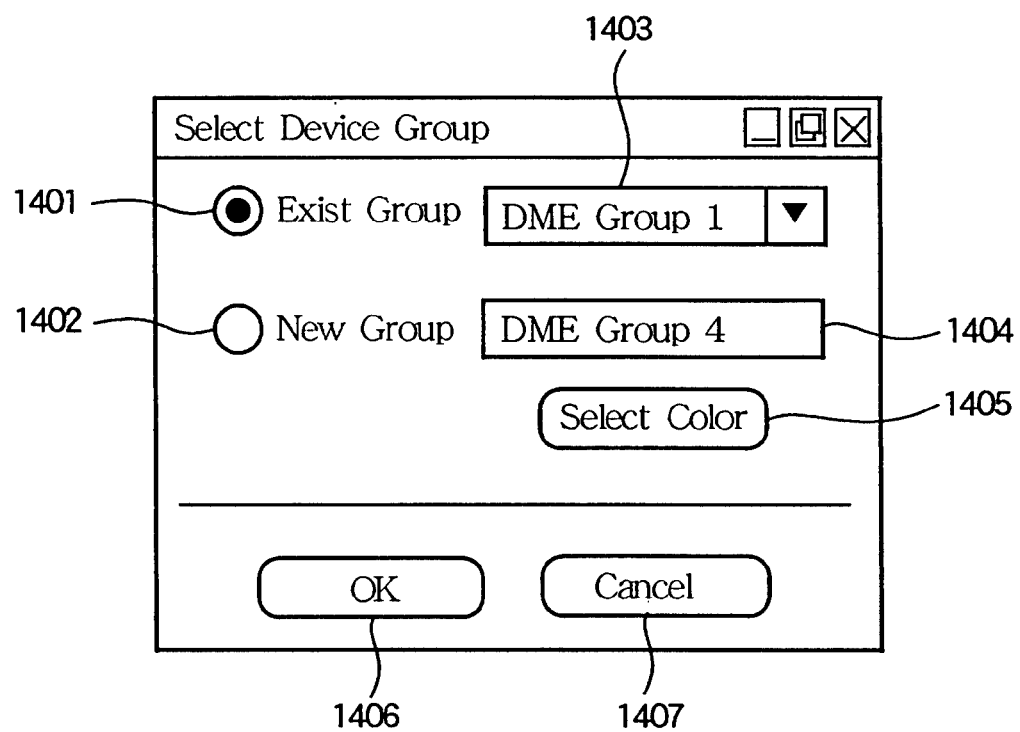
FIGS. 14A and 14B illustrate popup dialog boxes displayed when a new mixing engine is dragged and dropped into a CAD screen.

FIG. 14A illustrates a popup dialog box displayed when a new mixing engine is dragged and dropped into the CAD screen 1303 of FIG. 13. The user turns on either a radio button 1401 or 1402 to select whether the currently dragged and dropped mixing engine belongs to an existing device group or a new device group. When the user desires that the new mixing engine belong to an existing device group, the user turns on the radio button 1401 and selects one of the existing device groups through a list box 1403 and then turns on an OK button 1406. This allows the new mixing engine to be displayed on the CAD screen 1303 in the same color as that previously allocated to the selected device group.

When the user desires that the newly added mixing engine belong to a new device group, the user turns on the radio button 1402 and enters a name to a device group name entry region 1404. The user also turns on a Select Color button 1405 and specifies a color of the newly added device group and then turns on the OK button 1406. This allows the new device group to be displayed in the CAD screen 1303 and the new mixing engine to be displayed in the device group in the color specified by the user. When the user turns on a cancel button 1407, the new mixing engine addition is canceled.

Figure 14B:
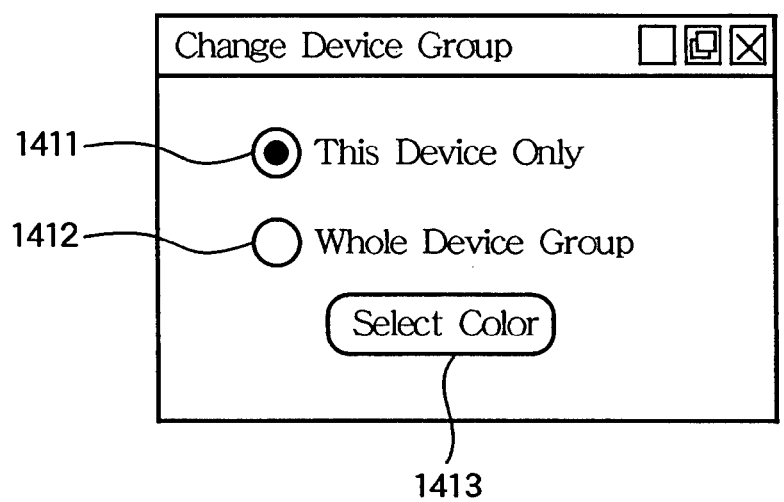

FIG. 14B illustrates a dialog box to change the display color of a device group. When the user selects a displayed element of a device from the CAD screen of FIG. 13 and then performs a predetermined manipulation (for example, a right mouse click), the dialog box of FIG. 14B is displayed. When the user desires to change the display color of the selected device alone, the user turns on a radio button 1411 and turns on a Select Color button 1413 to specify the new color. When the user desires to change the color of all devices of a device group to which the selected device belongs, the user turns on a radio button 1412 and turns on the Select Color button 1413 to specify the new color.

Figure 15:
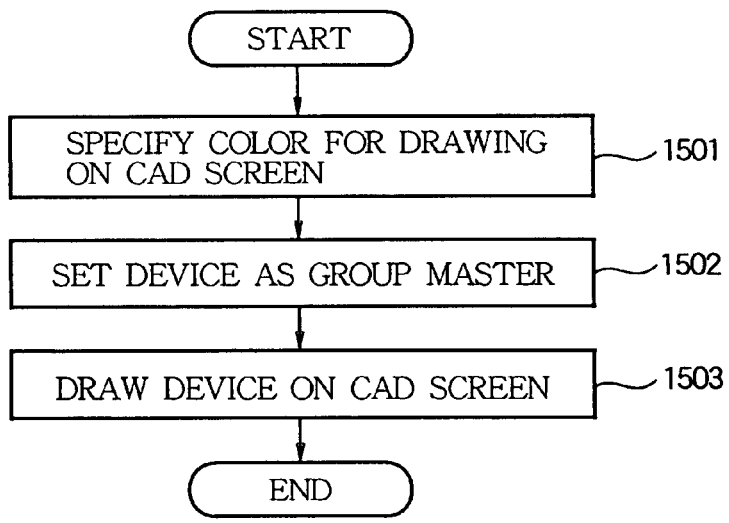
FIG. 15 is a flow chart illustrating a procedure when manipulations have been performed to add the first device to the CAD screen.

FIG. 15 illustrates a procedure when manipulations have been performed to add the first device to the CAD screen. This procedure is performed when the user drags and drops a new mixing engine to add it to the CAD screen with no mixing engine displayed on the CAD screen. At step 1501, the user is allowed to specify a color for drawing on the CAD screen. At step 1502, the added new mixing engine is set as a group master. At step 1503, the mixing engine is drawn on the CAD screen in the specified color. The procedure is then terminated.

Figure 16:
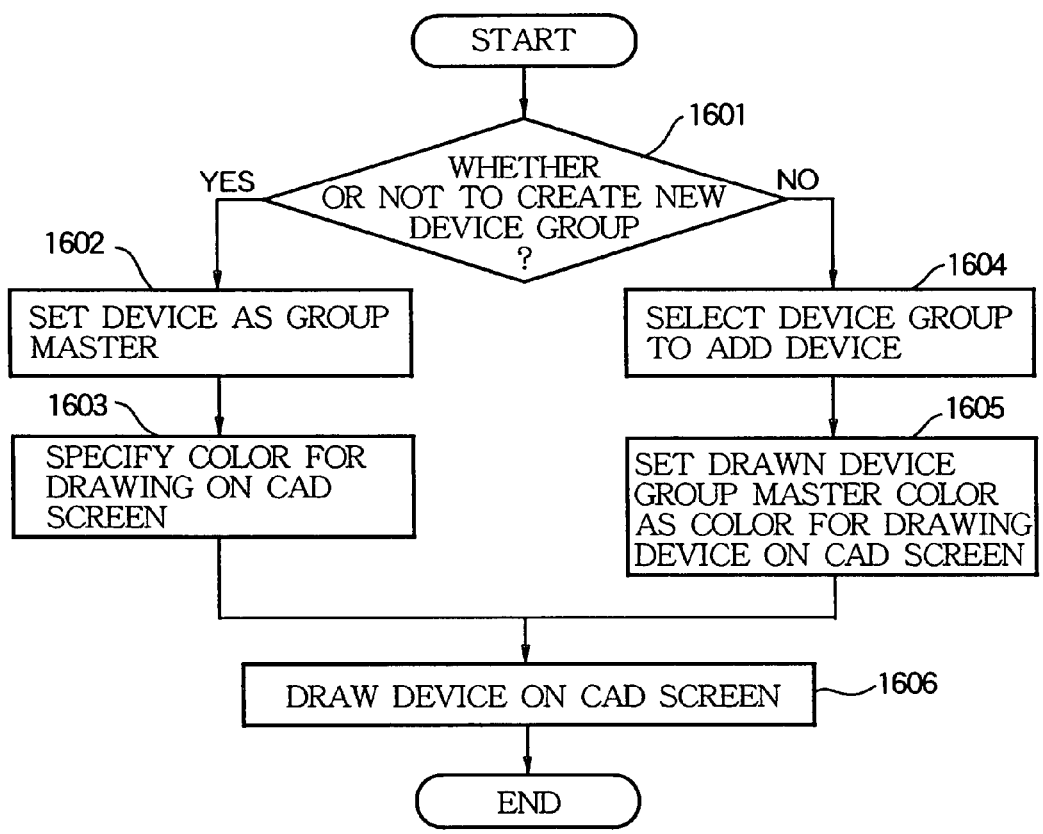
FIG. 16 is a flow chart illustrating a procedure when manipulations have been performed to add the second or subsequent device to the CAD screen.

FIG. 16 illustrates a procedure when manipulations have been performed to add the second or subsequent device to the CAD screen. Here, first, the dialog box of FIG. 14A is displayed. At step 1601, it is determined whether or not a new device group is to be created. This is based on a determination as to which one of the radio buttons 1401 and 1402 has been turned on in the dialog box of FIG. 14A. In the case where a new device group is created, the added mixing engine is set as a group master at step 1602 and the user is allowed to specify a color for drawing on the CAD screen at step 1603 and the added mixing engine is then drawn on the CAD screen at step 1606. In the case where no new device group is created, the user is allowed to select a device group to which the mixing engine is to be added at step 1604 and the color in which its group master is drawn is set as a color for drawing the mixing engine on the CAD screen at step 1605. Then, the procedure proceeds to step 1606.

FIG. 17 illustrates a procedure when the display color of devices on the CAD screen is changed at a later time. The user performs manipulations to display the dialog box of FIG. 14B. Thereafter, at step 1701, the user is allowed to specify a color for drawing on the CAD screen. At step 1702, it is determined whether or not the user has selected to change the display color of all devices of a device group to which the selected mixing engine belongs. When it is determined that the user has selected to change the display color of all devices of the device group, the display color of all devices of the device group is changed at step 1703. When it is determined that the user has selected to change the display color of the selected device alone, the display color of the selected device alone is changed at step 1704. After steps 1703 and 1704 are performed, the selected device is drawn on the CAD screen at step 1705. The procedure is then terminated.

What is claimed is:

1. An audio signal processing system comprising a plurality of audio signal processing apparatuses that process audio signals according to specified signal processing configurations and according to specified parameters used in processing of the audio signals, the plurality of the audio signal processing apparatuses being connected to each other through a network, wherein the plurality of the audio signal processing apparatuses are previously linked to form a zone, and are defined as devices belonging to the zone and further the devices are grouped into a plurality of device groups within the zone, wherein each of the plurality of the audio signal processing apparatuses includes:

a device group table that registers information specifying controls which are performed in respective audio signal processing apparatuses belonging to a device group in case that a group control command is given for collectively controlling the device group; and a master table that registers information specifying controls which are performed in respective device groups included in the zone in case that a zone control command is given for collectively controlling the zone, and wherein the audio signal processing apparatus belonging to the device group comprises:

a receiving section that receives a control command issued by a user manipulation or a control command inputted from an external device through the network;

a determining section that determines whether the received control command is a group control command or a zone control command;

a first transmitting section operative when the received control command is the group control command for transmitting an individual control command corresponding to the received group control command to each of the audio signal processing apparatuses belonging to the device group, with reference to the device group table; and a second transmitting section operative when the received control command is the zone control command for transmitting an individual group control command according to the received zone control command to each of the device groups included in the zone, with reference to the master table, wherein the device group table includes a device group scene table that registers one or more of scenes, each scene specifying parameters set to the audio signal processing apparatuses belonging to the device group, wherein the master table includes a scene master table that registers one or more of scene links, each scene link specifying a plurality of scenes in correspondence to the plurality of the device groups belonging to the zone, wherein the group control command is effective to select one of the scenes from the device group scene table so that the parameters specified by the selected scene are collectively set to the audio signal processing apparatuses belonging to the same device group, and wherein the zone control command is effective to select one of the scene links from the scene master table so that the parameters specified by the scenes specified by the selected scene link are collectively set to the audio signal processing apparatuses belonging to the same zone.

2. The audio signal processing system according to claim 1, wherein the device group table registers the information including information specifying control commands which are given to a part of the audio signal processing apparatuses belonging to the device group in case that the group control command has been given, and information indicating that no control command is given to the other part of the audio signal processing apparatuses belonging to the device group, and wherein the master table registers the information including information specifying group control commands which are given to a part of the device groups included in the zone in case that the zone control command has been given, and information indicating that no control command is given to the other part of the device groups included in the zone.

3. The audio signal processing system according to claim 1, wherein the device group includes one audio signal processing apparatus working as a master device and other audio signal processing apparatuses working as slave devices; and wherein the master device operates when receiving the group control command for transmitting the individual control commands to the slave devices of the same device group, and operates when receiving the zone control command for transmitting the individual group control commands to other master devices of other device groups.

4. The audio signal processing system according to claim 1, wherein the slave device operates when receiving a control command for transmitting the received control command to the master device of the same device group.

5. The audio signal processing system according to claim 1, further comprising a configuration editing apparatus for displaying and editing configurations of the audio signal processing apparatuses, the configuration editing apparatus comprising:
   a first display control section that displays an overall configuration of the devices of the zone on a screen; and
   a second display control section that displays respective configurations of the devices of the device groups included in the zone on the same screen.

6. The audio signal processing system according to claim 5, wherein the second display control section of the configuration editing apparatus displays the respective configurations of the devices of the device groups in colors specified respectively for the device groups.

7. The audio signal processing system according to claim 6, wherein the configuration editing apparatus further comprises:
   an issuing section that issues an instruction to add a graphic element representative of a new device on the screen; and
   a specifying section operative when the instruction to add a graphic element of a new device has been issued, for specifying whether the new device belongs to an existing device group or to a new device group, and inputting a corresponding device group name when the new device has been specified as belonging to a new device group.

8. An audio signal processing system comprising a plurality of audio signal processing apparatuses that process audio signals according to specified signal processing configurations and according to specified parameters used in processing of the audio signals, the plurality of the audio signal processing apparatuses being connected to each other through a network,
   wherein the plurality of the audio signal processing apparatuses are linked to form a zone and are defined as devices belonging to the zone, and further the devices are grouped into a plurality of device groups within the zone, and
   wherein each of the plurality of the audio signal processing apparatuses includes:
   a device group scene table that registers one or more of scenes, each scene specifying parameters set to the audio signal processing apparatuses belonging to a device group, one of the scenes being selected from the device group scene table in case that a group scene recall command is given for collectively commanding a scene recall of the device group; and
   a scene master table that registers one or more of scene links, each scene link specifying a plurality of scenes in correspondence to the plurality of the device groups included in the zone, one of the scene links being selected from the scene master table in case that a zone scene recall command is given for collectively commanding a scene recall of the zone, and
   wherein the audio signal processing apparatus belonging to the device group comprises:
   a receiving section that receives a scene recall command issued by a user manipulation or a scene recall command inputted from an external device through the network;
   a determining section that determines whether the received scene recall command is a device group scene recall command or a zone scene recall command;
   a first transmitting section operative when the received scene recall command is the device group scene recall command for transmitting an individual scene recall command corresponding to the received device group scene recall command to each of the audio signal processing apparatuses belonging to the device group, with reference to the device group scene table; and
   a second transmitting section operative when the received scene recall command is the zone scene recall command for transmitting an individual device group scene recall command according to the received zone scene recall command to each of the plurality of the device groups included in the zone with reference to the scene master table,
   whereby
   the group scene recall command is effective to select one of the scenes from the device group scene table so that the parameters specified by the selected scene are collectively set to the audio signal processing apparatuses belonging to the same device group, and the zone scene recall command is effective to select one of the scene links from the scene master table so that the parameters specified the scenes specified by the selected scene are collectively set to the audio signal processing apparatuses belonging to the same zone.

9. The audio signal processing system according to claim 8, wherein the device group scene table registers specifying a scene specifying parameters to a part of the plurality of the audio signal processing apparatuses belonging to the device group and specifying no parameters to the other part of the plurality of the audio signal processing apparatuses belonging to the device group, and
   wherein the scene master table registers a scene link specifying scenes in correspondence to a part of the plurality of the device groups included in the zone and specifying no scenes in correspondence to the other part of the plurality of the device groups included in the zone.

10. A configuration editing apparatus for displaying and editing configurations of a plurality of audio signal processing apparatuses that process audio signals according to the configurations and according to specified parameters used in processing of the audio signals in an audio signal processing system including the plurality of the audio signal processing apparatuses connected to each other through a network,
   wherein the plurality of the audio signal processing apparatuses are previously linked to form a zone and are defined as devices belonging to the zone, and further the devices are grouped into a plurality of device groups within the zone,
   wherein each of the plurality of the audio signal processing apparatuses includes: a device group table that registers information specifying controls which are performed in each of audio signal processing apparatuses belonging to a device group in case that a group control command is given for collectively controlling the device group; and a master table that registers information specifying controls which are performed in each of the device groups included in the zone in case that a zone control command is given for collectively controlling the zone, whereby both the collective control of the zone and the collective control of the device group are performed, wherein the configuration editing apparatus comprises: a first display control section that displays an overall configuration of the devices of the zone on a screen; and a second display control section that displays respective configurations of the devices of the device groups included in the zone on the same screen, wherein the device group table includes a device group scene table that registers one or more of scenes, each scene specifying parameters set to the audio signal processing apparatuses belonging to the device group, and the master table includes a scene master table that registers one or more of scene links, each scene link specifying a plurality of scenes in correspondence to the plurality of the device groups belonging to the zone, and wherein the group control command is effective to select one of the scenes from the device group scene table so that the parameters specified by the selected scene are collectively set to the audio signal processing apparatuses belonging to the same device group, and the zone control command is effective to select one of the scene links from the scene master table so that the parameters specified by the scenes specified by the selected scene link are collectively set to the audio signal processing apparatuses belonging to the same zone.

11. The configuration editing apparatus according to claim 10, wherein the second display control section displays the respective configurations of the devices of the device groups in colors specified respectively for the device groups.

12. The configuration editing apparatus according to claim 11, further comprising:

an issuing section that issues an instruction to add a graphic element representative of a new device on the screen; and a specifying section operative when the instruction to add a graphic element of a new device has been issued, for specifying whether the new device belongs to an existing device group or to a new device group and inputting a corresponding device group name when the new device has been specified as belonging to the new device group.

* * * * *